United States Patent
Song et al.

(10) Patent No.: US 12,075,166 B2
(45) Date of Patent: Aug. 27, 2024

(54) SPHERICAL IMAGE PROCESSING METHOD AND APPARATUS, AND SERVER

(71) Applicant: HUAWEI TECHNOLOGIES CO., LTD., Guangdong (CN)

(72) Inventors: Yi Song, Shenzhen (CN); Peiyun Di, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 630 days.

(21) Appl. No.: 17/213,050

(22) Filed: Mar. 25, 2021

(65) Prior Publication Data

US 2021/0218890 A1  Jul. 15, 2021

Related U.S. Application Data

(63) Continuation of application No. PCT/CN2019/107360, filed on Sep. 23, 2019.

(30) Foreign Application Priority Data

Sep. 26, 2018 (CN) .......................... 201811125870.6

(51) Int. Cl.
  *G06T 3/40* (2024.01)
  *G06T 19/00* (2011.01)
  *H04N 23/698* (2023.01)

(52) U.S. Cl.
  CPC ............. *H04N 23/698* (2023.01); *G06T 3/40* (2013.01); *G06T 19/006* (2013.01)

(58) Field of Classification Search
  CPC .... H04N 23/698; H04N 21/6587; G06T 3/40; G06T 19/006; G06T 15/205; G06T 3/0025; G06T 3/4007; G06F 3/147
  See application file for complete search history.

(56) References Cited

U.S. PATENT DOCUMENTS

| | | | |
|---|---|---|---|
| 9,998,664 B1* | 6/2018 | Long | A63F 13/85 |
| 2013/0044108 A1* | 2/2013 | Tanaka | H04N 13/111 |
| | | | 345/419 |

(Continued)

FOREIGN PATENT DOCUMENTS

| | | |
|---|---|---|
| CN | 103955960 A | 7/2014 |
| CN | 104835117 A | 8/2015 |

(Continued)

OTHER PUBLICATIONS

Jiang long, Research on Panoramic Imaging of 360 Degree Parking Assist System, Chinese Excellent Master's Dissertation Full-text Database: Information Technology Series, 2018, Issue 02, 74 pages.

*Primary Examiner* — Ian L Lemieux
*Assistant Examiner* — Woo C Rhim
(74) *Attorney, Agent, or Firm* — WOMBLE BOND DICKINSON (US) LLP

(57) ABSTRACT

This application provides a spherical image processing method which includes: obtaining a spherical image and determining a sphere center of the spherical image; determining a viewpoint of a user when the user views the spherical image, where the viewpoint is located at any point, other than the sphere center, in a sphere space surrounded by the spherical image; determining a pixel expansion region and a pixel shrinkage region on the spherical image based on the sphere center and the viewpoint; and performing an image processing operation on the spherical image, where the image processing operation comprises a pixel expansion processing operation on an image in the pixel expansion region, and a pixel shrinkage processing operation on an image in the pixel shrinkage region.

18 Claims, 11 Drawing Sheets

(56) References Cited

U.S. PATENT DOCUMENTS

| | | | | |
|---|---|---|---|---|
| 2013/0071012 | A1* | 3/2013 | Leichsenring | G06T 19/00 |
| | | | | 382/154 |
| 2013/0100132 | A1* | 4/2013 | Katayama | H04N 13/156 |
| | | | | 345/420 |
| 2016/0352791 | A1* | 12/2016 | Adams | H04N 21/816 |
| 2017/0076429 | A1* | 3/2017 | Russell | G06T 15/04 |
| 2018/0199029 | A1* | 7/2018 | Van Der Auwera | |
| | | | | H04N 5/2628 |
| 2018/0227558 | A1* | 8/2018 | Oto | G06T 3/00 |
| 2018/0278916 | A1* | 9/2018 | Kim | G03B 37/04 |
| 2019/0141359 | A1* | 5/2019 | Taquet | H04N 21/6373 |
| 2020/0053393 | A1* | 2/2020 | Niamut | G06T 3/0062 |
| 2020/0143511 | A1* | 5/2020 | Wang | G06T 3/005 |
| 2020/0389640 | A1* | 12/2020 | Lee | H04N 13/194 |
| 2021/0192678 | A1* | 6/2021 | Wang | G06T 3/4007 |

FOREIGN PATENT DOCUMENTS

| | | | | |
|---|---|---|---|---|
| CN | 106097245 A | | 11/2016 | |
| CN | 106127691 A | | 11/2016 | |
| CN | 106846245 A | | 6/2017 | |
| CN | 106991640 A | * | 7/2017 | ........... G06T 3/0043 |
| CN | 106991640 A | | 7/2017 | |
| CN | 107230180 A | * | 10/2017 | ............... G06T 3/00 |
| CN | 107230180 A | | 10/2017 | |
| CN | 107396077 A | * | 11/2017 | ............. G06F 3/013 |
| CN | 107396077 A | | 11/2017 | |
| CN | 107622474 A | | 1/2018 | |
| CN | 107864370 A | * | 3/2018 | |
| CN | 107924556 A | | 4/2018 | |
| CN | 108124108 A | * | 6/2018 | ............. H04N 5/262 |
| CN | 108124108 A | | 6/2018 | |
| KR | 20180066551 A | | 6/2018 | |
| WO | WO-2018068612 A1 | * | 4/2018 | ............... G06T 3/00 |
| WO | 2018166430 A1 | | 9/2018 | |
| WO | WO-2018166430 A1 | * | 9/2018 | ........... H04N 19/563 |

* cited by examiner

SPHERICAL IMAGE PROCESSING METHOD AND APPARATUS, AND SERVER

CROSS-REFERENCE TO RELATED APPLICATIONS

This application is a continuation of International Application No. PCT/CN2019/107360, filed on Sep. 23, 2019, which claims priority to Chinese Patent Application No. 201811125870.6, filed on Sep. 26, 2018. The disclosures of the aforementioned applications are herein incorporated by reference in their entireties.

TECHNICAL FIELD

This application relates to image processing technologies, and in particular, to a spherical image processing method and apparatus, and a server.

BACKGROUND

In a virtual reality (VR) panoramic video application, a user can view a dynamic 360-degree video from any direction, and enjoy a whole new viewing experience. Currently, three degrees of freedom (3DoF) viewing is mostly adopted to view panoramic videos. In such an application, a viewpoint (including VR glasses, a mobile phone, a tablet computer, a television, a computer, and the like) is always at a central point of a sphere formed by a panoramic video, so that the panoramic video can be freely viewed in yaw, pitch, and roll angles. However, as people have more demand for VR-like strong immersive experience, they expect to wear the viewpoint to move freely in the space. In this case, they can have same or similar experience of viewing the video as in the real world. Therefore, how to scale an object in a panoramic video in image processing becomes one of key technologies.

In the prior art, during image processing of a panoramic video, picture content in a field of view range of a viewpoint accordingly increases or decreases when the viewpoint moves forward or backward. However, if the terminal rotates again, the content in the corresponding field of view moves excessively fast (rotation after zoom-in) or excessively slow (rotation after zoom-out). This does not comply with a case in which people view while walking around in the real world and cannot achieve immersive visual effects. This affects user experience.

SUMMARY

This application provides a spherical image processing method and apparatus, and a server, to implement partial zoom-in and partial zoom-out based on an actual view of a viewpoint when a user views a spherical image. In this way, the user can replicate a viewing experience similar to that in the real world in which an actually viewed object appears bigger or smaller when the user moves toward or away from the object.

According to a first aspect, this application provides a spherical image processing method, to process each frame of spherical image in a panoramic video. A server first obtains a spherical image, where a transverse span of the spherical image is 360 degrees, a longitudinal span is 180 degrees, and space surrounded by the spherical image is spherical. In this application, because a viewpoint moves, a picture that can be seen within view of the viewpoint zooms in or zooms out compared with the picture in a sphere center position. To adapt to this change, the server needs to divide regions on the spherical image, to zoom in some regions (pixel expansion regions) and zoom out some regions (pixel shrinkage regions) on the spherical image. Zoom-in and zoom-out percentages are not the same and depend on the actual situation. Therefore, different image processing may be performed for the different regions on the divided spherical image. Image processing in this application includes performing pixel expansion processing on an image in the pixel expansion region, and performing pixel shrinkage processing on an image in the pixel shrinkage region. The pixel expansion processing includes increasing a quantity of image pixels in the pixel expansion region, and the pixel shrinkage processing includes reducing a quantity of image pixels in the pixel shrinkage region. It can be learned that, after the foregoing processing is performed on the spherical image, the spherical image is no longer simply zoomed in or zoomed out in this application, but is partially zoomed in or zoomed out based on an actual view of the viewpoint. Therefore, in a process in which a user views a VR panoramic video, the viewpoint freely moves and the user can replicate a viewing experience similar to that in the real world in which an actually viewed object appears bigger or smaller when the user moves toward or away from the object. Even if the user moves around, the user can see that the object gradually appears bigger or smaller, instead of seeing all objects appearing smaller in a telescope. This is consistent with the real-world changes in zooming, creating a stronger sense of immersion.

In an embodiment, the server may first determine a pixel that is on the spherical image and that satisfies a geometric rule, where the geometric rule is set based on the sphere center and the viewpoint. Then, the server may determine the pixel expansion region and the pixel shrinkage region based on the pixel.

According to the foregoing method, the server may determine, based on an offset of the viewpoint relative to the sphere center, first pixels that are on the spherical image and whose distances from the viewpoint are equal to r. Then, the server may divide the spherical image into two regions by using a circle connecting the first pixels as a boundary. A region including a pixel whose distance from the viewpoint is less than r is used as the pixel expansion region, and a region including a pixel whose distance from the viewpoint is greater than r is used as the pixel shrinkage region.

According to the foregoing method, the server may alternatively determine, by using the viewpoint as a vertex and by using a connection line from the viewpoint to the sphere center as an angular bisector, second pixels that are on the spherical image and that correspond to an angle whose angular degree is θ. Then, the server may divide the spherical image into two regions by using an arc connecting the second pixels as a boundary. A region closer to the viewpoint is used as the pixel expansion region, and a region farther from the viewpoint is used as the pixel shrinkage region.

In an embodiment, the server may further determine a transition region on the spherical image based on the sphere center and the viewpoint. Therefore, the image processing further includes: performing pixel expansion processing on a part that is in an image in the transition region and closer to the pixel expansion region, and performing pixel shrinkage processing on a part that is in the image in the transition region and closer to the pixel shrinkage region.

According to the foregoing method, the server may further construct a hexahedron tangent to the spherical image based on the sphere center and the viewpoint, construct six cones based on faces of the hexahedron and the sphere center, and divide the spherical image into six regions based on pixels at intersection of the six cones and the spherical image. A region corresponding to a face that is of the hexahedron and that is perpendicular to an extension line of a connection line from the sphere center to the viewpoint is used as the pixel expansion region. A region corresponding to a face that is of the hexahedron and that is perpendicular to an extension line of the connection line from the viewpoint to the sphere center is used as the pixel shrinkage region. Regions corresponding to remaining four faces are used as the transition region.

In an embodiment, the server may determine, by using the viewpoint as the vertex and by using the extension line of the connection line from the sphere center to the viewpoint as the angular bisector, third pixels that are on the spherical image and that correspond to an angle whose angular degree is $\psi$. The angle whose angular degree is $\psi$ is an FoV angle at the viewpoint. The server constructs a square pyramid tangent to the spherical image. The top of the square pyramid is enclosed by an extension line of a connection line from the sphere center to the third pixels and a point that a plane tangent to the spherical image touches.

In an embodiment, the server may determine, by using the viewpoint as the vertex and by using the extension line of the connection line from the sphere center to the viewpoint as the angular bisector, third pixels that are on the spherical image and that correspond to an angle whose angular degree is $\psi$. The angle whose angular degree is $\psi$ is an FoV angle at the viewpoint. The server may determine, by using the sphere center as a vertex and by using the extension line of the connection line from the viewpoint to the sphere center as an angular bisector, fourth pixels that are on the spherical image and that correspond to an angle whose angular degree is S. The angle whose angular degree is $\delta$ is a rear-view field angle. The server may construct a quadrangular pyramid partially tangent to the spherical image. A side face of the quadrangular pyramid is tangent to the spherical image. The top of the quadrangular pyramid is enclosed by an extension line of a connection line from the sphere center to the third pixels and a point that the side face of the quadrangular pyramid touches. The bottom of the quadrangular pyramid is enclosed by an extension line of a connection line from the sphere center to the fourth pixels and the point that the side face of the quadrangular pyramid touches.

According to the foregoing method, the server may use, on the spherical image, a region corresponding to the top of the quadrangular pyramid as the pixel expansion region, use a region corresponding to the bottom of the quadrangular pyramid as the pixel shrinkage region, and use a region corresponding to the side face of the quadrangular pyramid as the transition region.

In an embodiment, the server may construct an offset sphere by using the viewpoint as the sphere center and by using a radius of the sphere space surrounded by the spherical image as a radius; and divide a spherical surface of the offset sphere into a plurality of regions, where the plurality of regions are in a one-to-one correspondence with the regions on the divided spherical image; determine a mapping relationship between a region on the offset sphere and a corresponding region on the divided spherical image, and perform the image processing on the divided spherical image according to the mapping relationship.

According to the foregoing method, the server may first adjust the quadrangular pyramid to construct a cube tangent to the offset sphere, where each face of the cube and the viewpoint constitute six cones, and divide the offset sphere into six regions based on pixels at intersection of the six cones and the offset sphere; and determine a mapping relationship between a pixel on the spherical image and a point on the quadrangular pyramid, and determine a mapping relationship between the cube and the offset sphere, and determine the mapping relationship between the point on the offset sphere and the pixel on the spherical image based on a mapping relationship between the quadrangular pyramid and the cube.

In the foregoing embodiment, six mapping faces of the quadrangular pyramid are scaled to a same size to form a cube. The cube is tangent to the offset sphere whose sphere center is the viewpoint. A diameter of the spherical image is used as a side length of each face of the scaled cube. It can be learned that a pixel in a region corresponding to a front-view face is expanded, a pixel in a region corresponding to a rear-view face is shrunk, and a pixel in a region corresponding to a side-view face gradually changes from being expanded to being shrunk in a direction from the front-view face to the rear-view face. Therefore, in a process in which the user views a VR panoramic video, the viewpoint freely moves and the user can replicate a viewing experience similar to that in the real world in which an actually viewed object appears bigger or smaller when the user moves toward or away from the object. Even if the user moves around, the user can see that the object gradually appears bigger or smaller, instead of seeing all objects appearing smaller in a telescope. This is consistent with the real-world changes in zooming, creating a stronger sense of immersion.

In an embodiment, when the spherical image uses non-three-dimensional space spherical coordinates to represent pixels, the non-three-dimensional space spherical coordinates include any one of pixel coordinates in an equirectangular projection ERP format, pixel coordinates in a cubemap projection CMP format, pixel coordinates in a Craster parabolic projection CPP format, pixel coordinates in an adjusted cubemap projection ACP format, and pixel coordinates in a truncated square pyramid projection TSP format, pixel coordinates in a compact octahedron projection COUP format, and pixel coordinates in a compact icosahedral projection CISP format. Therefore, after obtaining the spherical image, the server first maps coordinates representing pixels in the spherical image to three-dimensional space spherical coordinates that use the sphere center as an origin. After the performing the image processing on the divided spherical image, the server inversely maps the coordinates representing the pixels in the spherical image to the non-three-dimensional space spherical coordinates.

In an embodiment, when the spherical image is a 3D panoramic spherical image, the 3D panoramic spherical image includes a left-eye spherical image and a right-eye spherical image. Therefore, after obtaining the spherical image, for the left-eye spherical image, the server first determines a left-eye sphere center of the left-eye spherical image, obtains a left-eye viewpoint, then determines a pixel expansion region and a pixel shrinkage region on the left-eye spherical image based on the left-eye sphere center and the left-eye viewpoint, and finally performs the image processing on the left-eye spherical image. For the right-eye spherical image, the server first determines a right-eye sphere center of the right-eye spherical image, obtains a right-eye viewpoint, then determines a pixel expansion region and a pixel shrinkage region on the right-eye spherical image based on the right-eye sphere center and the right-eye viewpoint; and finally performs the image processing on the right-eye spherical image.

According to a second aspect, this application provides a spherical image processing apparatus, including:

an image obtaining module, configured to obtain a spherical image and determine a sphere center of the spherical image;

a position determining module, configured to determine a viewpoint of a user when the user views the spherical image, where the viewpoint is located at any point, other than the sphere center, in sphere space surrounded by the spherical image;

a region determining module, configured to determine a pixel expansion region and a pixel shrinkage region on the spherical image based on the sphere center and the viewpoint; and a processing module, configured to perform image processing on the spherical image, where the image processing includes performing pixel expansion processing on an image in the pixel expansion region, and perform pixel shrinkage processing on an image in the pixel shrinkage region, where the pixel expansion processing includes increasing a quantity of image pixels in the pixel expansion region, and the pixel shrinkage processing includes reducing a quantity of image pixels in the pixel shrinkage region.

In an embodiment, the region determining module is configured to determine a pixel that is on the spherical image and that satisfies a geometric rule, and determine the pixel expansion region and the pixel shrinkage region based on the pixel, where the geometric rule is set based on the sphere center and the viewpoint.

In an embodiment, the region determining module is configured to determine, based on an offset of the viewpoint relative to the sphere center, first pixels that are on the spherical image and whose distances from the viewpoint are equal to r; and determine the pixel expansion region and the pixel shrinkage region by using a circle connecting the first pixels as a boundary, where a region including a pixel whose distance from the viewpoint is less than r is used as the pixel expansion region, and a region including a pixel whose distance from the viewpoint is greater than r is used as the pixel shrinkage region.

In an embodiment, the region determining module is configured to determine, by using the viewpoint as a vertex and by using a connection line from the viewpoint to the sphere center as an angular bisector, second pixels that are on the spherical image and that correspond to an angle whose angular degree is $\theta$; and determine the pixel expansion region and the pixel shrinkage region by using an arc connecting the second pixels as a boundary, where a region closer to the viewpoint is used as the pixel expansion region, and a region farther from the viewpoint is used as the pixel shrinkage region.

In an embodiment, the region determining module is further configured to determine a transition region on the spherical image based on the sphere center and the viewpoint; where the image processing further includes: performing pixel expansion processing on a part that is in an image in the transition region and closer to the pixel expansion region, and performing pixel shrinkage processing on a part that is in the image in the transition region and closer to the pixel shrinkage region.

In an embodiment, the region determining module is configured to construct a hexahedron tangent to the spherical image based on the sphere center and the viewpoint; construct six cones based on faces of the hexahedron and the sphere center; and divide the spherical image into six regions based on pixels at intersection of the six cones and the spherical image, where a region corresponding to a face that is of the hexahedron and that is perpendicular to an extension line of a connection line from the sphere center to the viewpoint is used as the pixel expansion region, a region corresponding to a face that is of the hexahedron and that is perpendicular to an extension line of the connection line from the viewpoint to the sphere center is used as the pixel shrinkage region, and regions corresponding to remaining four faces are used as the transition regions.

In an embodiment, the region determining module is configured to determine, by using the viewpoint as the vertex and by using the extension line of the connection line from the sphere center to the viewpoint as the angular bisector, third pixels that are on the spherical image and that correspond to an angle whose angular degree is $\psi$, where the angle whose angular degree is $\psi$ is an FoV angle at the viewpoint; and construct a square pyramid tangent to the spherical image, where the top of the square pyramid is enclosed by an extension line of a connection line from the sphere center to the third pixels and a point that a plane tangent to the spherical image touches.

In an embodiment, the region determining module is configured to determine, by using the viewpoint as the vertex and by using the extension line of the connection line from the sphere center to the viewpoint as the angular bisector, third pixels that are on the spherical image and that correspond to an angle whose angular degree is $\psi$, where the angle whose angular degree is $\psi$ is an FoV angle at the viewpoint; determine, by using the sphere center as a vertex and by using the extension line of the connection line from the viewpoint to the sphere center as an angular bisector, fourth pixels that are on the spherical image and that correspond to an angle whose angular degree is S, where the angle whose angular degree is $\delta$ is a rear-view field angle; and construct a quadrangular pyramid partially tangent to the spherical image, where a side face of the quadrangular pyramid is tangent to the spherical image; the top of the quadrangular pyramid is enclosed by an extension line of a connection line from the sphere center to the third pixels and a point that the side face of the quadrangular pyramid touches, and the bottom of the quadrangular pyramid is enclosed by an extension line of a connection line from the sphere center to the fourth pixels and the point that the side face of the quadrangular pyramid touches.

In an embodiment, the region determining module is configured to: on the spherical image, use a region corresponding to the top of the quadrangular pyramid as the pixel expansion region, use a region corresponding to the bottom of the quadrangular pyramid as the pixel shrinkage region, and use a region corresponding to the side face of the quadrangular pyramid as the transition region.

In an embodiment, the processing module is configured to construct an offset sphere by using the viewpoint as the sphere center and by using a radius of the sphere space surrounded by the spherical image as a radius; divide a spherical surface of the offset sphere into a plurality of regions, where the plurality of regions are in a one-to-one correspondence with the regions on the divided spherical image; and determine a mapping relationship between a region on the offset sphere and a corresponding region on the divided spherical image, and perform the image processing on the divided spherical image according to the mapping relationship.

In an embodiment, the processing module is configured to determine a mapping relationship between a point on the offset sphere and a pixel on the spherical image.

In an embodiment, the processing module is configured to adjust the quadrangular pyramid to construct a cube tangent to the offset sphere, where each face of the cube and the viewpoint constitute six cones, and divide the offset sphere into six regions based on pixels at intersection of the six cones and the offset sphere; and determine a mapping relationship between a pixel on the spherical image and a point on the quadrangular pyramid, and determine a mapping relationship between the cube and the offset sphere, and determine the mapping relationship between the point on the offset sphere and the pixel on the spherical image based on a mapping relationship between the quadrangular pyramid and the cube.

In an embodiment, when the spherical image uses non-three-dimensional space spherical coordinates to represent pixels, the non-three-dimensional space spherical coordinates include any one of pixel coordinates in an equirectangular projection ERP format, pixel coordinates in a cubemap projection CMP format, pixel coordinates in a Craster parabolic projection CPP format, pixel coordinates in an adjusted cubemap projection ACP format, and pixel coordinates in a truncated square pyramid projection TSP format, pixel coordinates in a compact octahedron projection COUP format, and pixel coordinates in a compact icosahedral projection CISP format; the image obtaining module is further configured to map coordinates representing pixels in the spherical image to three-dimensional space spherical coordinates that use the sphere center as an origin; and the processing module is further configured to inversely map the coordinates representing the pixels in the spherical image to the non-three-dimensional space spherical coordinates.

In an embodiment, when the spherical image is a 3D panoramic spherical image, the 3D panoramic spherical image includes a left-eye spherical image and a right-eye spherical image; for the left-eye spherical image, the image obtaining module is further configured to determine a left-eye sphere center of the left-eye spherical image, the position determining module is further configured to obtain a left-eye viewpoint, the region division module is further configured to determine a pixel expansion region and a pixel shrinkage region on the left-eye spherical image based on the left-eye sphere center and the left-eye viewpoint, and the processing module is further configured to perform the image processing on the left-eye spherical image; and for the right-eye spherical image, the image obtaining module is further configured to determine a right-eye sphere center of the right-eye spherical image, the position determining module is further configured to obtain a right-eye viewpoint, the region division module is further configured to determine a pixel expansion region and a pixel shrinkage region on the right-eye spherical image based on the right-eye sphere center and the right-eye viewpoint; and the processing module is further configured to perform the image processing on the right-eye spherical image.

According to a third aspect, this application provides a server, and the server includes:

one or more processors, and a storage apparatus, configured to store one or more programs.

When the one or more programs are executed by the one or more processors, the one or more processors are enabled to implement the spherical image processing method according to any one of the embodiments of the first aspect.

According to a fourth aspect, this application provides a computer-readable storage medium. The computer-readable storage medium stores a computer program. The computer program includes at least one line of code. The at least one line of code is executed by a computer to perform the spherical image processing method according to any one of the first aspect.

According to a fifth aspect, this application provides a computer program. When executed by a computer, the computer program is used to perform the spherical image processing method according to any one of the first aspect.

According to the spherical image processing method and apparatus, and the server in this application, regions on a spherical image are divided based on movement of a viewpoint, and pixel expansion processing or pixel shrinkage processing is performed by region, so that the spherical image is partially zoomed in or zoomed out based on an actual view of the viewpoint. Therefore, in a process in which a user views a VR panoramic video, the viewpoint freely moves and the user can replicate a viewing experience similar to that in the real world in which an actually viewed object appears bigger or smaller when the user moves toward or away from the object. Even if the user moves around, the user can see that the object gradually appears bigger or smaller, instead of seeing all objects appearing smaller in a telescope. This is consistent with the real-world changes in zooming, creating a stronger sense of immersion.

BRIEF DESCRIPTION OF DRAWINGS

To describe the technical solutions in this application or in the prior art more clearly, the following briefly describes the accompanying drawings for describing the embodiments or the prior art. Apparently, the accompanying drawings in the following description show some embodiments of this application, and a person of ordinary skill in the art may still derive other drawings from these accompanying drawings without creative efforts.

DESCRIPTION OF EMBODIMENTS

To make the objectives, technical solutions, and advantages of this application clearer, the following clearly and completely describes the technical solutions in this application with reference to the accompanying drawings in this application. Apparently, the described embodiments are merely a part rather than all of the embodiments of this application. All other embodiments obtained by a person of ordinary skill in the art based on the embodiments of this application without creative efforts shall fall within the protection scope of this application.

In this application, based on movement of a viewpoint in sphere space surrounded by a spherical image, resampling processing is performed on pixels on the entire spherical image, so that when the viewpoint is closer to the spherical image, pixel expansion is performed on a front-view face (in other words, content is reduced compared with that of an original image, and the image zooms in), and pixel shrinkage is performed on a rear-view face (in other words, content is added compared with that of the original image, and the image zooms out); when the viewpoint is far away from the spherical image, pixel shrinkage is performed on the front-view face (in other words, content is added compared with that of the original image, and the image zooms out), and pixel expansion is performed on the rear-view face (in other words, content is reduced compared with that of the original image, and the image zooms in), to obtain a new spherical image. The viewpoint is a viewing orientation selected by a user to view a spherical image. A position of the viewpoint may be a position of the user wearing VR glasses when the user views the spherical image, or may be a position of a sensor when the user views the spherical image by using the sensor, for example, a position of the sensor remotely operated and controlled by the user by using a computer, a terminal, or the like. A picture is captured by using the sensor and transmitted back to the computer, the terminal, or the like for viewing. After the foregoing processing, in a process in which the user views a VR panoramic video, the viewpoint freely moves and the user can replicate a viewing experience similar to that in the real world in which an actually viewed object appears bigger or smaller when the user moves toward or away from the object. Even if the user moves around, the user can see that the object gradually appears bigger or smaller, instead of seeing all objects appearing smaller in a telescope. This is consistent with the real-world changes in zooming, creating a stronger sense of immersion.

Figure 1:
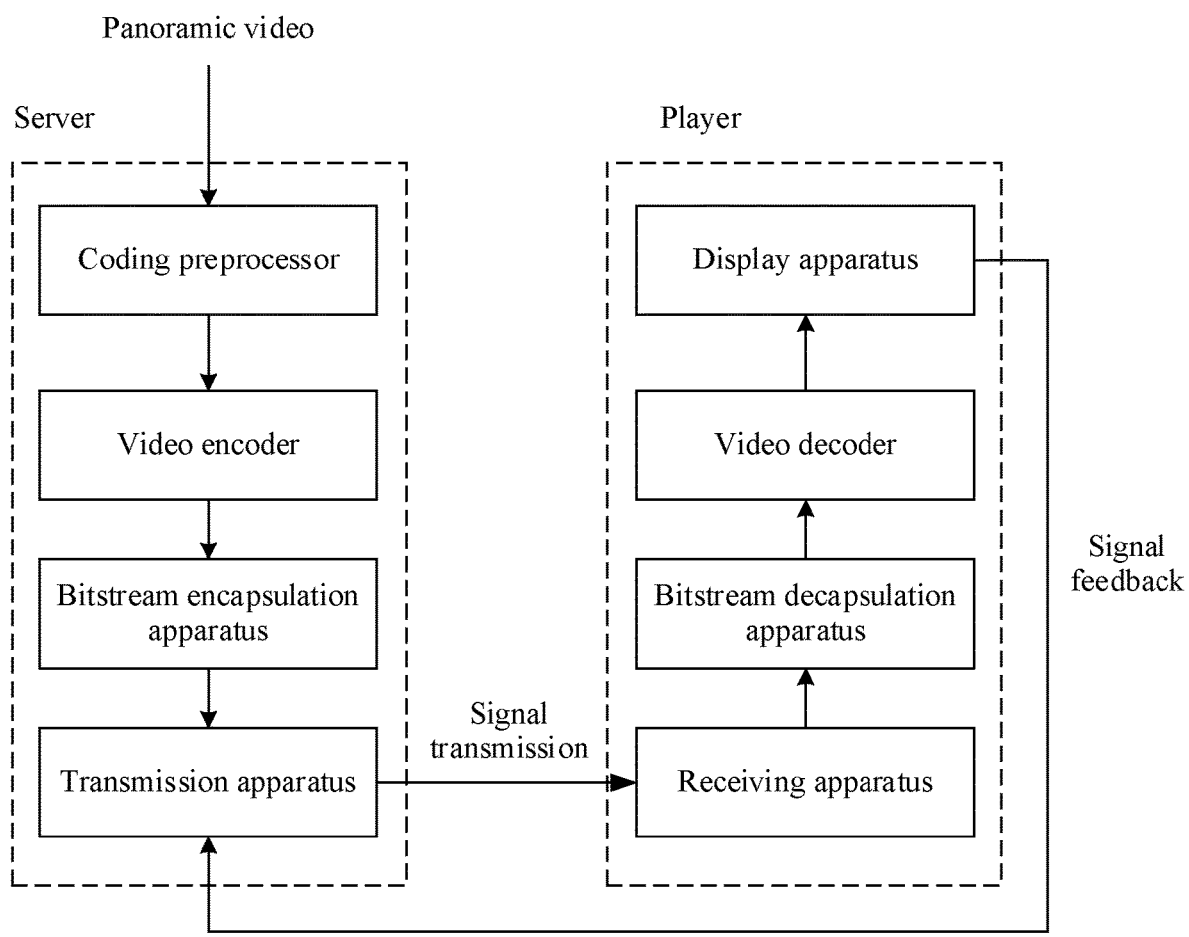
FIG. 1 is a schematic diagram of a structure of an embodiment of a panoramic video processing framework according to this application.

FIG. 1 is a schematic diagram of a structure of an embodiment of a panoramic video processing framework according to this application. As shown in FIG. 1, a panoramic video is processed by a server and transmitted to a player, and is played by the player to the user. In this embodiment, the server includes a coding preprocessor, a video encoder, a bitstream encapsulation apparatus, and a transmission apparatus. The server preprocesses, encodes, or transcodes the panoramic video, encapsulates encoded bitstream data into a transmittable file, and transmits the transmittable file to the player over a network. The server may further select, based on information (for example, a user's viewing direction) fed back by the player, content that needs to be transmitted for transmission. The player includes a receiving apparatus, a bitstream decapsulation apparatus, a video decoder, and a display apparatus. The player is an electronic device that can be connected to a network, for example, VR glasses, a mobile phone, a tablet computer, a television, or a computer. The player receives data sent by the server, and performs bitstream decapsulation, decoding, and display.

To replicate a viewing experience similar to that in the real world in which an actually viewed object appears bigger or smaller when the user moves toward or away from the object, this application provides a spherical image processing method, to process each frame of spherical image in a panoramic video. The method may be performed by the server in the foregoing framework, which is a coding preprocessor. The server first obtains a spherical image, where a transverse span of the spherical image is 360 degrees, a longitudinal span is 180 degrees, and space surrounded by the spherical image is spherical. The server may directly obtain the spherical image from a panoramic video shooting camera or a storage device, or obtain the spherical image by decoding a bitstream received from a network. In the prior art, a viewpoint is usually placed at a sphere center position of the foregoing sphere. In this application, the viewpoint is moved in sphere space surrounded by the spherical image, and a position of the viewpoint may be reported to the server after being positioned by a device (for example, a device including a position sensor) at the viewpoint, or the position may be located by the server based on communication between the server and the device at the viewpoint. Because the viewpoint moves, a picture that can be seen within view of the viewpoint zooms in or zooms out. To adapt to this change, the server needs to determine a plurality of regions on the spherical image. In this application, the regions determined by the server may include a pixel, an arc, and a closed region on the spherical image. The server is configured to zoom in some regions (pixel expansion regions) and zoom out some regions (pixel shrinkage regions) on the spherical image. Zoom-in and zoom-out percentages are not the same and depend on the actual situation. Therefore, different image processing may be performed for the different regions on the divided spherical image. Image processing in this application includes performing pixel expansion processing on an image in the pixel expansion region, and performing pixel shrinkage processing on an image in the pixel shrinkage region. The pixel expansion processing includes increasing a quantity of image pixels in the pixel expansion region, and the pixel shrinkage processing includes reducing a quantity of image pixels in the pixel shrinkage region. It can be learned that, after the foregoing processing is performed on the spherical image, the spherical image is no longer simply zoomed in or zoomed out in this application, but is partially zoomed in or zoomed out based on an actual view of the viewpoint. Therefore, in a process in which a user views a VR panoramic video, the viewpoint freely moves and the user can replicate a viewing experience similar to that in the real world in which an actually viewed object appears bigger or smaller when the user moves toward or away from the object. Even if the user moves around, the user can see that the object gradually appears bigger or smaller, instead of seeing all objects appearing smaller in a telescope. This is consistent with the real-world changes in zooming, creating a stronger sense of immersion.

The following uses several specific embodiments to describe in detail the technical solution of the foregoing method embodiment.

Figure 2:
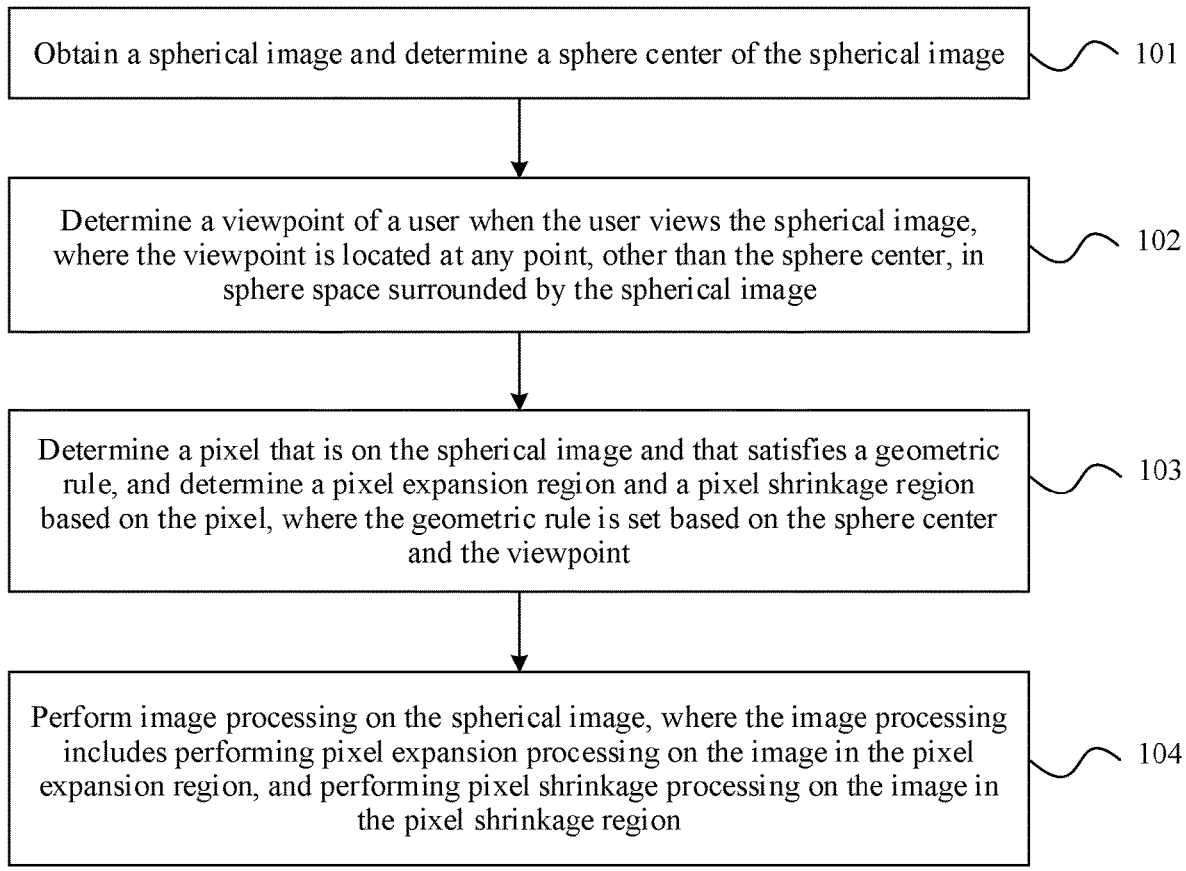
FIG. 2 is a flowchart of Embodiment 1 of a spherical image processing method according to this application.

FIG. 2 is a flowchart of Embodiment 1 of a spherical image processing method according to this application. As shown in FIG. 2, the method in this embodiment may include:

Step 101: Obtain a spherical image and determine a sphere center of the spherical image.

As described above, after obtaining the spherical image, a server determines the sphere center based on sphere space surrounded by the spherical image.

Step 102: Determine a viewpoint of a user when the user views the spherical image, where the viewpoint is located at any point, other than the sphere center, in the sphere space surrounded by the spherical image.

This embodiment is applicable to a scenario in which the viewpoint moves relative to the sphere center. Therefore, the viewpoint may be any point, other than the sphere center, in the sphere space surrounded by the spherical image. The viewpoint may be obtained in a plurality of manners, and this is not limited in this embodiment.

Step 103: Determine a pixel that is on the spherical image and that satisfies a geometric rule, and determine a pixel expansion region and a pixel shrinkage region based on the pixel, where the geometric rule is set based on the sphere center and the viewpoint.

In an embodiment of determining the pixel that is on the spherical image and that satisfies the geometric rule, where the geometric rule is set based on the sphere center and the viewpoint, a corresponding threshold is determined to satisfy the specified geometric rule, the corresponding pixel is determined on the spherical image based on the threshold, and then the pixel expansion region and the pixel shrinkage region are determined by using the pixel as a boundary of the regions. In this embodiment, the spherical image is divided into two regions: the pixel expansion region and the pixel shrinkage region. To be specific, pixel expansion processing is performed on an image in the pixel expansion region, and pixel shrinkage processing is performed on an image in the pixel shrinkage region. If the viewpoint is not at the sphere center and is shifted, there are certainly a part close to the spherical image and a part far away from the spherical image. In a practical case, when vision remains unchanged, a closer distance to a picture indicates a smaller image range and more visible details. A farther distance to the picture indicates a larger image range and fewer visible details. Therefore, in this application, the region in which pixels need to be expanded and the region in which pixels need to be shrunk on the corresponding spherical image need to be divided based on movement of the viewpoint.

Figure 3:
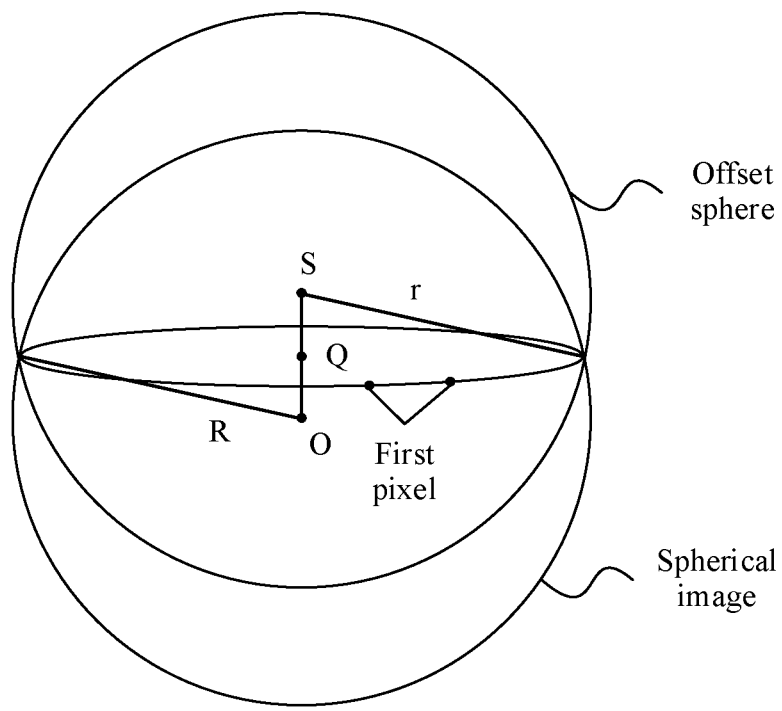
FIG. 3 is a schematic diagram of region division in Embodiment 1 of a spherical image processing method according to this application.

For example, FIG. 3 is a schematic diagram of region division in Embodiment 1 of a spherical image processing method according to this application. As shown in FIG. 3, the server first determines, based on an offset of the viewpoint relative to the sphere center, first pixels that are on the spherical image and whose distances from the viewpoint are equal to r, and determines the pixel expansion region and the pixel shrinkage region by using a circle connecting the first pixels as a boundary. A region including a pixel whose distance from the viewpoint is less than r is used as the pixel expansion region, and a region including a pixel whose distance from the viewpoint is greater than r is used as the pixel shrinkage region.

In this embodiment, the threshold that is set based on the sphere center and the viewpoint is a length r, the sphere center of the sphere space surrounded by the spherical image is O, a radius is R, and the viewpoint is S. In a front-view face, a part located above in FIG. 3 is the viewpoint. It can be seen that the viewpoint is closer to the spherical image after the viewpoint is moved. The server constructs an offset sphere whose center is S and radius is r. A point at which the offset sphere touches the spherical image are the first pixels. A circle Q connecting the first pixels divides the spherical image into an upper region and a lower region. Distances between all pixels in the upper region and S are less than r, and therefore the upper region is used as the pixel expansion region. Distances between all pixels in the lower region and S are greater than r, and therefore the lower region is used as the pixel shrinkage region.

Figure 4:
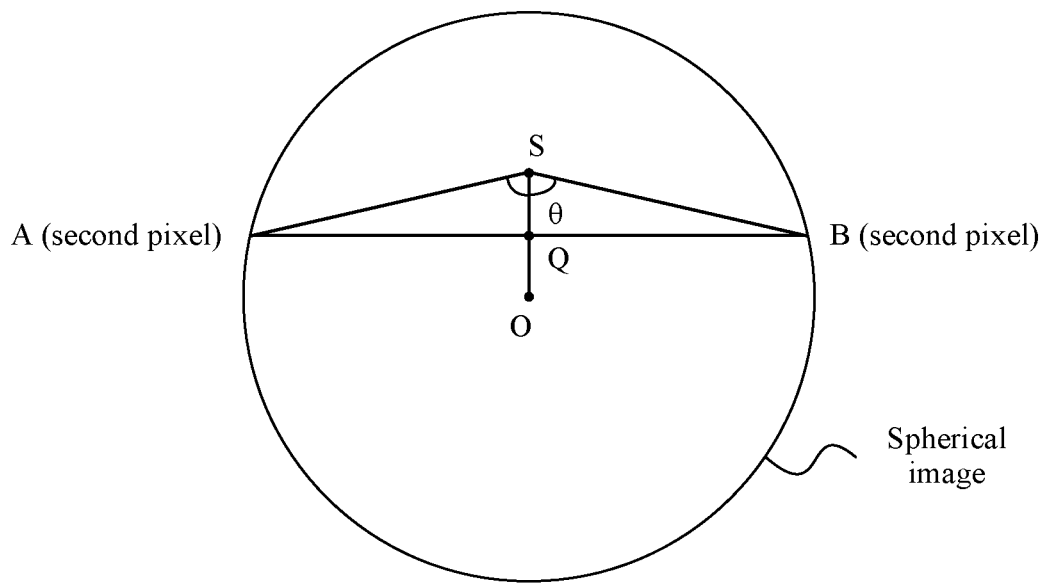
FIG. 4 is a schematic diagram of region division in Embodiment 1 of a spherical image processing method according to this application.

For example, FIG. 4 is a schematic diagram of region division in Embodiment 1 of a spherical image processing method according to this application. As shown in FIG. 4, the server first determines, by using the viewpoint as a vertex and by using a connection line from the viewpoint to the sphere center as an angular bisector, second pixels that are on the spherical image and that correspond to an angle whose angular degree is θ; and determines the pixel expansion region and the pixel shrinkage region by using an arc connecting the second pixels as a boundary. A region closer to the viewpoint is used as the pixel expansion region, and a region farther from the viewpoint is used as the pixel shrinkage region.

This embodiment shows a cross-sectional view of the spherical image. It can be seen that the viewpoint is closer to the spherical image. The threshold that is set based on the sphere center and the viewpoint is the angle θ. The server uses S as the vertex and uses the connection line from S to O as the angular bisector, to construct the angle whose angular degree is θ. Pixels at which the angle touches the spherical image are A and B (the second pixels). A circle Q connecting the second pixels is expanded to three-dimensional space. An upper region closer to the viewpoint is used as the pixel expansion region, and a lower region farther from the viewpoint is used as the pixel shrinkage region.

Step 104: Perform image processing on the spherical image, where the image processing includes performing pixel expansion processing on the image in the pixel expansion region, and performing pixel shrinkage processing on the image in the pixel shrinkage region.

Pixel expansion means that an associated neighboring region of a pixel becomes bigger. In other words, a quantity of pixels in the associated neighboring region of the pixel increases, and more associated pixels appear next to the pixel. Pixel shrinkage means that an associated neighboring region of a pixel becomes smaller. In other words, a quantity of pixels in the associated neighboring region of the pixel is reduced, and fewer associated pixels appear next to the pixel. The associated pixels refer to pixels that are associated with each other and that are generated by performing an image processing operation (for example, copying or interpolation) on one or a group of pixels including at least one same pixel. For example, a pixel A is obtained by performing interpolation on pixels X1, X2, and X3, and a pixel B is obtained by performing interpolation on pixels X1, X4, X5, and X6. Because both the pixel A and the pixel B are obtained by using a group of pixels including the pixel X1, both A and B are associated pixels of the pixel X1. In this application, an interpolation calculation method may be determined based on a requirement. For example, one pixel is interpolated between two pixels, or one pixel is interpolated between a plurality of pixels. This is not limited in this embodiment. For a pixel, an associated neighboring region of the pixel refers to a set of pixels formed by associated pixels of the pixel in an image that includes a specific region range of the pixel. The specific region range belongs to the pixel expansion region or the pixel shrinkage region, and may or may not include other non-associated pixels.

In this application, the regions on the spherical image are divided based on movement of the viewpoint, and the pixel expansion processing or the pixel shrinkage processing is performed by region, so that the spherical image is partially zoomed in or zoomed out based on an actual view of the viewpoint. Therefore, in a process in which the user views a VR panoramic video, the viewpoint freely moves and the user can replicate a viewing experience similar to that in the real world in which an actually viewed object appears bigger or smaller when the user moves toward or away from the object. Even if the user moves around, the user can see that the object gradually appears bigger or smaller, instead of seeing all objects appearing smaller in a telescope. This is consistent with the real-world changes in zooming, creating a stronger sense of immersion.

Figure 5:
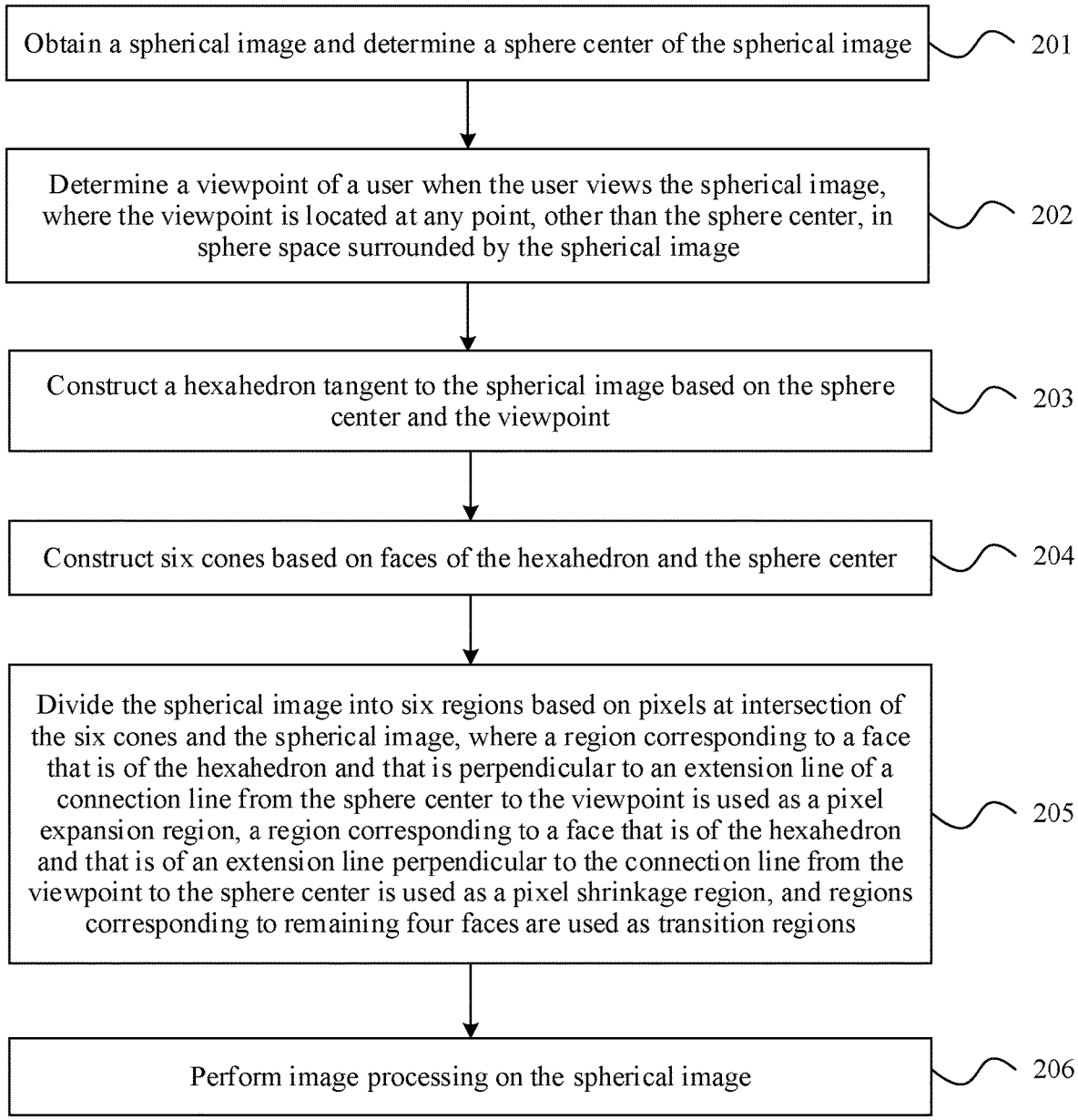
FIG. 5 is a flowchart of Embodiment 2 of a spherical image processing method according to this application.

Based on the foregoing technical solution, FIG. 5 is a flowchart of Embodiment 2 of a spherical image processing method according to this application. As shown in FIG. 5, the method in this embodiment may include the following operations.

Operation 201: Obtain a spherical image and determine a sphere center of the spherical image.

Operation 202: Determine a viewpoint of a user when the user views the spherical image, where the viewpoint is located at any point, other than the sphere center, in the sphere space surrounded by the spherical image.

Operation 203: Construct a hexahedron tangent to the spherical image based on the sphere center and the viewpoint.

Figure 6:
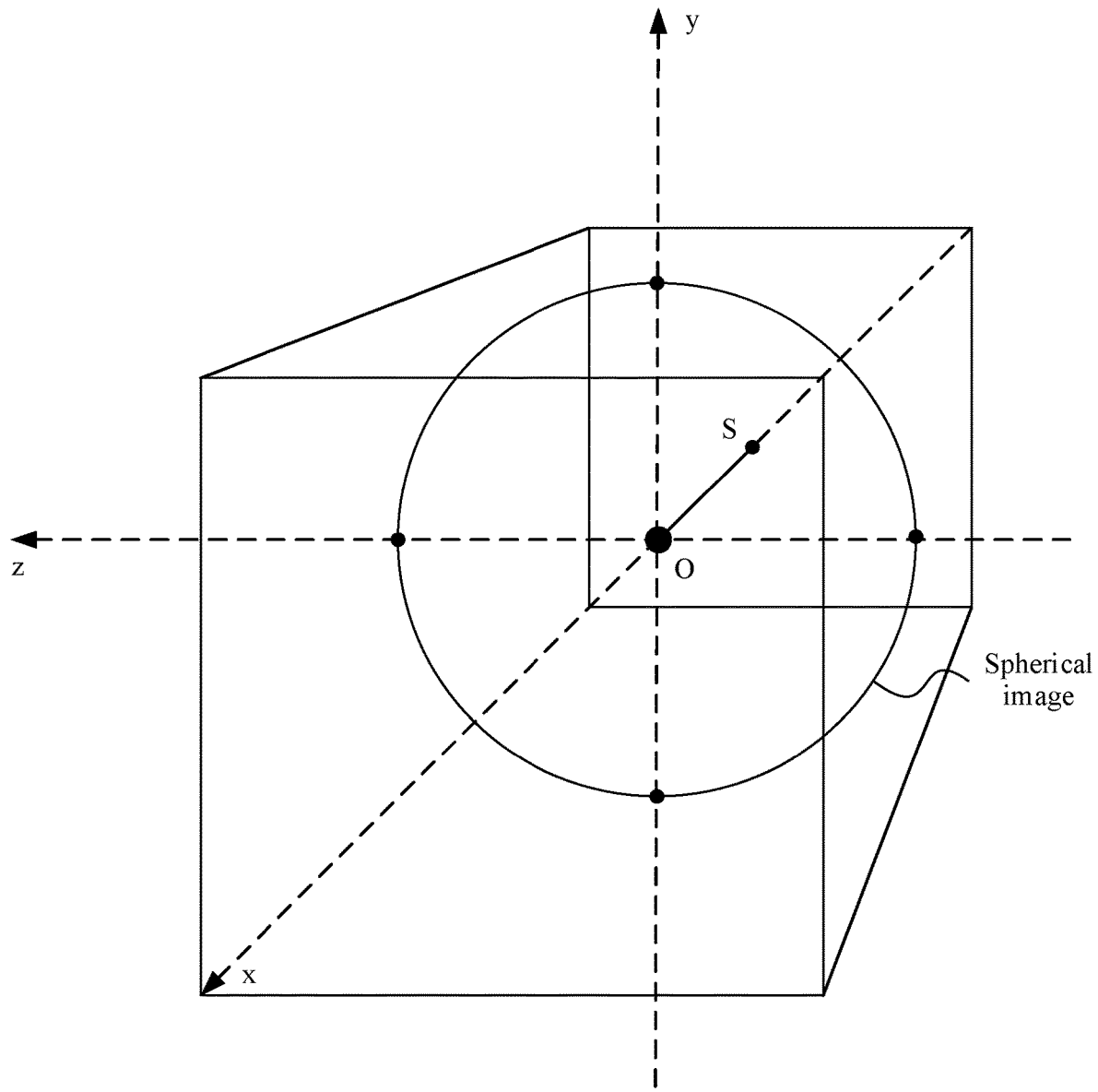
FIG. 6 is a three-dimensional schematic diagram of a hexahedron in Embodiment 2 of a spherical image processing method according to this application.

FIG. 6 is a three-dimensional schematic diagram of a hexahedron in Embodiment 2 of a spherical image processing method according to this application. As shown in FIG. 6, a front-view face of the viewpoint faces a reverse direction of an x-axis, and the viewpoint moves from an O point to an S point and is close to the front-view face of the spherical image.

Figure 7:
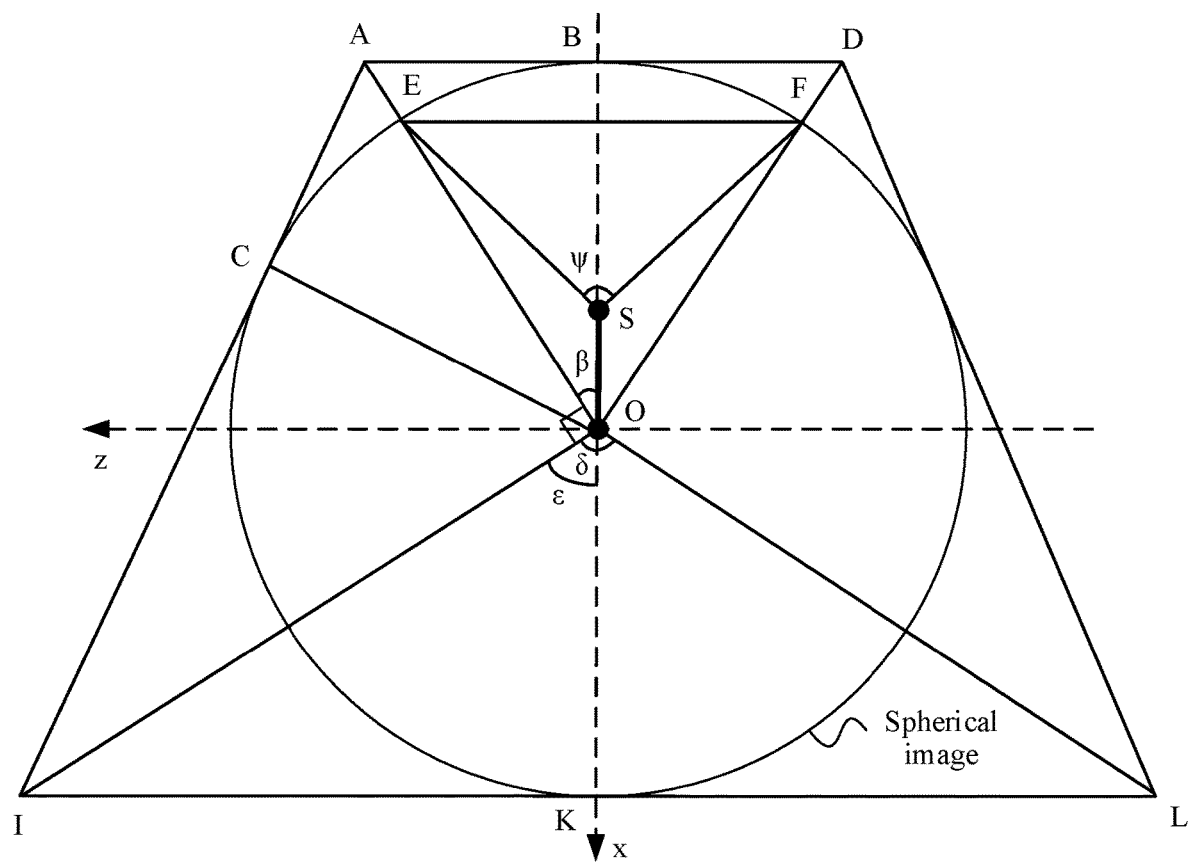
FIG. 7 is a schematic diagram of region division in Embodiment 2 of a spherical image processing method according to this application.

For example, FIG. 7 is a schematic diagram of region division in Embodiment 2 of a spherical image processing method according to this application. As shown in FIG. 7, a server determines, by using the viewpoint as a vertex and by using an extension line of a connection line from the sphere center to the viewpoint as an angular bisector, third pixels that are on the spherical image and that correspond to an angle whose angular degree is $\psi$, where the angle whose angular degree is $\psi$ is a field of view (FoV) angle at the viewpoint; and constructs a square pyramid tangent to the spherical image, where the top of the square pyramid is enclosed by an extension line of a connection line from the sphere center to the third pixels and a point that a plane tangent to the spherical image touches.

This embodiment shows a cross-sectional view of the spherical image and the hexahedron. An upper part of FIG. 7 is a front-view face of the viewpoint. The FoV angle $\psi$ is set, and two sides of the angle whose angular degree is $\psi$ touch a circle O. Points E and F may be obtained on the circle O. □ESF is the FoV angle, and indicates that content of the spherical image visible at S in a direction of the extension line of the OS connection line is a picture within an arc surface EF. The FoV angle $\psi$ is used as a field angle to construct the square pyramid of the spherical image based on the three-dimensional space. The top AD of the square pyramid, in the front-view face, is tangent to the spherical image at a point B. Four planes that are all tangent to a sphere are obtained from each side of the top of the square pyramid to a positive direction of the x-axis. One plane AI of the planes is tangent to the spherical image at a point C. Straight lines that intersect adjacent planes are used as a plane boundary to obtain four trapezoids, which may be used as four side-view faces. The bottom IL of the square pyramid, in a rear-view face, is tangent to the spherical image at a point K. Straight lines that intersect the four trapezoids in the side-view face are used as a plane boundary, to obtain a rectangular face.

Figure 8A:
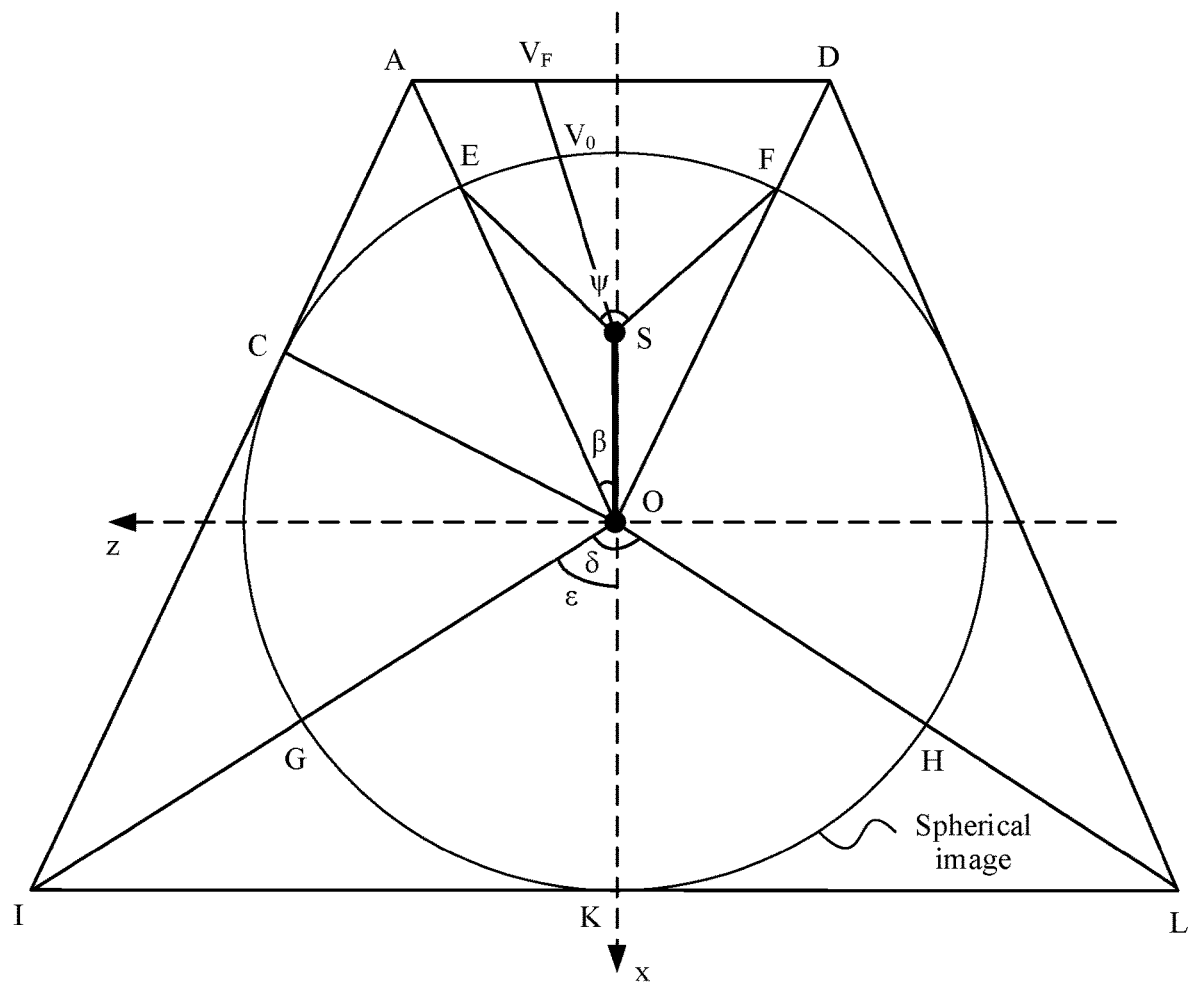
FIG. 8a to FIG. 8c are schematic diagrams of region division in Embodiment 2 of a spherical image processing method according to this application.
Figure 8B:
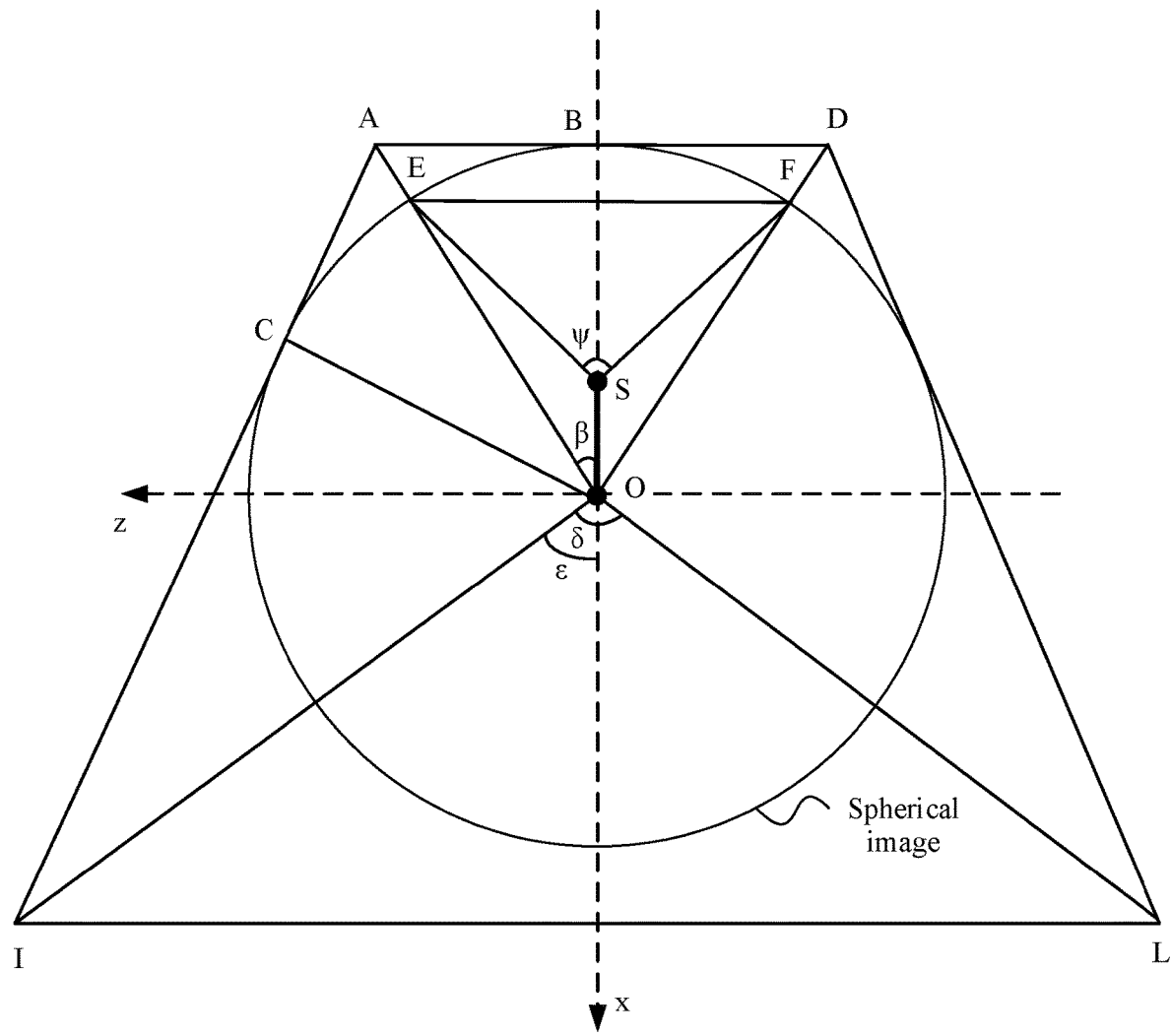
Figure 8C:
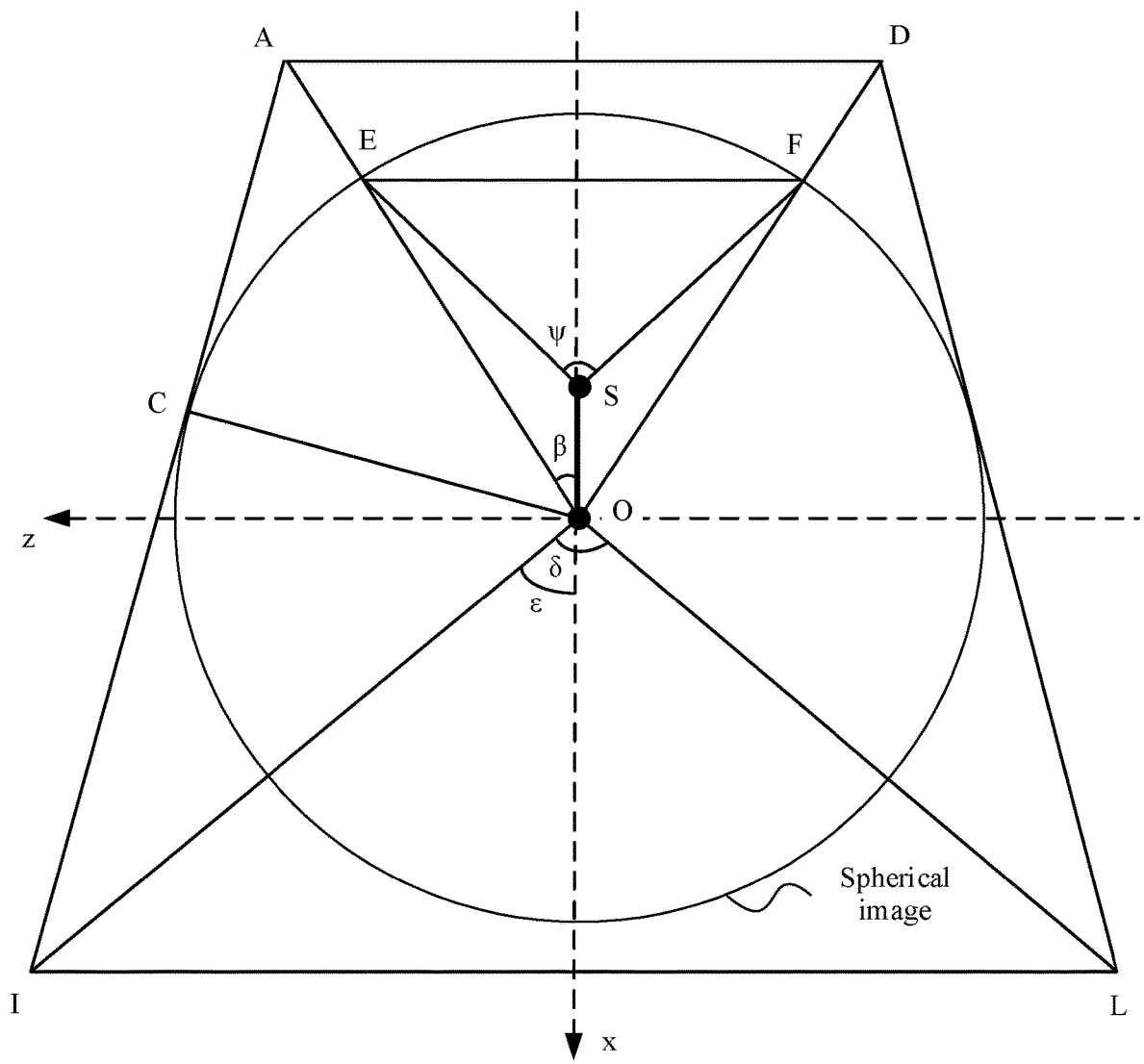

For example, FIG. 8*a* to FIG. 8*c* are schematic diagrams of region division in Embodiment 2 of a spherical image processing method according to this application. As shown in FIG. 8*a* to FIG. 8*c*, the server determines, by using the viewpoint as the vertex and by using the extension line of the connection line from the sphere center to the viewpoint as the angular bisector, third pixels that are on the spherical image and that correspond to an angle whose angular degree is $\psi$, where the angle whose angular degree is $\psi$ is an FoV angle at the viewpoint; determines, by using the sphere center as a vertex and by using an extension line of a connection line from the viewpoint to the sphere center as an angular bisector, fourth pixels that are on the spherical image and that correspond to an angle whose angular degree is S, where the angle whose angular degree is S is a rear-view field angle; and constructs a quadrangular pyramid partially tangent to the spherical image by using the FoV angle and the rear-view field angle as a threshold. A side face of the quadrangular pyramid is tangent to the spherical image. The top of the quadrangular pyramid is enclosed by an extension line of a connection line from the sphere center to the third pixels and a point that the side face of the quadrangular pyramid touches. The bottom of the quadrangular pyramid is enclosed by an extension line of a connection line from the sphere center to the fourth pixels and the point that the side face of the quadrangular pyramid touches.

This embodiment shows three cross-sectional views of the spherical image and the hexahedron. An upper part of FIG. 8*a* to FIG. 8*c* are front-view faces of the viewpoint. In FIG. 8*a*, the spherical image is tangent to the bottom (rear-view face) and a side (side-view face) of the hexahedron. In FIG. 8*b*, the spherical image is tangent to the top (front-view face) and the side (side-view face) of the hexahedron. In FIG. 8*c*, the spherical image is tangent to only the side (side-view face) of the hexahedron. It can be seen that neither the front-view face nor the rear-view face of the hexahedron may be tangent to the spherical image, or one of the front-view face and the rear-view face of the hexahedron is not tangent to the spherical image. In this embodiment, the regions on the spherical image are divided based on the FoV angle $\psi$ at the viewpoint and the rear-view field angle $\delta$. To be specific, the quadrangular pyramid partially tangent to the spherical image may be constructed based on the FoV angle $\psi$, the rear-view field angle $\delta$, and a case in which the side-view face is tangent to the spherical image. Two sides of the angle whose angular degree is $\psi$ touch a circle O. Points E and F may be obtained on the circle O. □ESF is the FoV angle, and indicates that content of the spherical image visible at S in a direction of the extension line of the OS connection line is a picture within an arc surface EF. The following describes three methods for constructing the quadrangular pyramid with respect to FIG. 8*a* to FIG. 8*c*.

The rear-view field angle $\delta$ is used as a field angle to construct the quadrangular pyramid tangent to the spherical image. The bottom of the quadrangular pyramid is tangent to the spherical image, and boundaries at the bottom are formed by straight lines in which the rear-view field angle $\delta$ touches a tangent plane. Four planes that are all tangent to a sphere are obtained from each side of the bottom of the quadrangular pyramid to a reverse direction of the x-axis. Straight lines that intersect adjacent planes are used as a plane boundary to obtain four trapezoids, which may be used as four side-view faces. The FoV angle $\psi$ is used as a field angle to obtain the points E and F on the circle O. An extension line of a connection line between a point O and each of the point E and the point F intersects the four side-view faces. The intersected straight lines are used as boundaries to form the top of the quadrangular pyramid, that is, the front-view face. FIG. 8a shows the quadrangular pyramid constructed by using the foregoing method.

The FoV angle $\psi$ is used as a field angle to construct the quadrangular pyramid tangent to the spherical image. The top of the quadrangular pyramid is tangent to the spherical image, and the boundaries at the top are formed by straight lines in which the FoV angle $\psi$ intersects a tangent plane. Four planes that are all tangent to the sphere are obtained from each side of the top of the quadrangular pyramid to a positive direction of the x-axis. Straight lines that intersect adjacent planes are used as a plane boundary to obtain four trapezoids, which may be used as four side-view faces. The rear-view field angle $\delta$ is used as a field angle to intersect the four side-view faces. The intersected straight lines are used as boundaries to form the bottom of the quadrangular pyramid, that is, the rear-view face. FIG. 8b shows the quadrangular pyramid constructed by using the foregoing method.

The FoV angle $\psi$ and the rear-view field angle $\delta$ are used as field angles to construct the quadrangular pyramid tangent to the spherical image. Four sides of the quadrangular pyramid are all tangent to the spherical image. Straight lines that intersect adjacent planes are used as a plane boundary to obtain four trapezoids, which may be used as four side-view faces. The FoV angle $\psi$ is used as a field angle to intersect the four side-view faces. The intersected straight lines are used as boundaries to form the top of the quadrangular pyramid, that is, the front-view face. The rear-view field angle $\delta$ is used as a field angle to intersect the four side-view faces. The intersected straight lines are used as boundaries to form the bottom of the quadrangular pyramid, that is, the rear-view face. FIG. 8c shows the quadrangular pyramid constructed by using the foregoing method.

Optionally, the rear-view field angle $\delta$ may also be obtained through calculation by using the FoV angle $\psi$, and the following calculation process may be used:

It is assumed that a radius of the circle O is r=1 and an offset length from S to O is |OS|. A size of a half field angle of the front-view face at the point O may be obtained based on the FoV angle $\psi$.

$\beta = \psi/2 - \arcsin(|OS| \cdot \sin(\psi/2))$

Side-View Face Field Angle Size $\eta = \angle AOI = (2\pi - \psi - 2\beta)/2$

The quadrangular pyramid may be determined based on angles $\beta$, $\delta$, and $\eta$.

After the half field angle of the front-view face is obtained, the rear-view field angle $\delta$ may be determined based on $\beta$. In one manner, a field angle range of $\beta$ and $\epsilon$ is specified, and a value of $\delta$ corresponding to $\beta$ is obtained in a linear manner. Herein, $\epsilon = \frac{1}{2}\delta$. It is assumed that $\beta \in [\beta_{min}, \beta_{max}]$ and $\epsilon \in [\epsilon_{min}, \epsilon_{max}]$ are specified, and a manner of calculating $\epsilon$ based on $\beta$ is as follows:

$$\varepsilon = \varepsilon_{max} - \frac{(\varepsilon_{max} - \varepsilon_{min})}{(\beta_{max} - \beta_{min})} \cdot (\beta - \beta_{min})$$

Operation 204: Construct six cones based on faces of the hexahedron and the sphere center.

On the basis of the quadrangular pyramid, six cones are obtained from the point O to each plane of the quadrangular pyramid.

Operation 205: Divide the spherical image into six regions based on pixels at intersection of the six cones and the spherical image, where a region corresponding to a face that is of the hexahedron and that is perpendicular to the extension line of the connection line from the sphere center to the viewpoint is used as the pixel expansion region, a region corresponding to a face that is of the hexahedron and that is perpendicular to an extension line of the connection line from the viewpoint to the sphere center is used as the pixel shrinkage region, and regions corresponding to remaining four faces are used as transition regions.

On the basis of the quadrangular pyramid, a region that is on the spherical image and that corresponds to the front-view face is used as the pixel expansion region, a region that is on the spherical image and that corresponds to the rear-view face is used as the pixel shrinkage region, and regions that are on the spherical image and that correspond to the side-view faces are used as the transition regions.

Operation 206: Perform image processing on the spherical image.

After the regions on the spherical image are determined, pixel distribution on the spherical image may be adjusted based on the regions, and pixels are expanded or shrunk. A pixel distribution change actually relates to a change in a distance between two pixels on the spherical image. In the pixel expansion region, a distance between two pixels on the spherical image is increased. In the pixel shrinkage region, a distance between two pixels on the spherical image is reduced. Therefore, a coordinate mapping relationship before and after the spherical image is converted needs to be determined. The server constructs an offset sphere by using the viewpoint as the sphere center and by using a radius of the sphere space surrounded by the spherical image as a radius, and divides the offset sphere into a plurality of regions, where the plurality of regions are in a one-to-one correspondence with the regions on the spherical image and determines a mapping relationship between a region on the offset sphere and a corresponding region on the spherical image. In other words, the server determines a mapping relationship between a point $V_1(x_1, y_1, z_1)$ on the offset sphere and a point $V_0(x_0, y_0, z_0)$ on the spherical image.

One method is to determine the mapping relationship by mapping from a spherical surface to a mapping face and then inversely mapping from the mapping face to the spherical surface. The mapping face refers to six faces of the quadrangular pyramid. The quadrangular pyramid shown in FIG. 8a is used as an example to describe an entire mapping process.

(1) For any point on a given mapping face, obtain a corresponding point on the spherical image.

As shown in FIG. 8a, any pixel on the spherical image is mapped to a mapping face corresponding to a region in which the pixel is located. In other words, a position of any point on the mapping face in the corresponding region on the spherical image is obtained. If a point on the arc surface EF corresponds to the front-view face AD, for any $V_F$ point $(x_F, y_F, z_F)$ on the front-view face AD, a corresponding point $V_0$ point $(x_0, y_0, z_0)$ on the arc surface EF is obtained based on a mapping function $(x_0, y_0, z_0) = f(x_F, y_F, Z_F)$. It should be noted that $V_F$ may not be on an $OV_0$ ray. For another mapping face, a position of a point on the mapping face in a corresponding region on the spherical image may also be obtained based on a function $f_N(x, y, z)$ corresponding to the another mapping face.

For example, a $V_F$ point $(x_F, y_F, Z_F)$ on a mapping face corresponds to two-dimensional coordinates $(x_f, y_f)$ on the mapping face, and the two points may be mutually converted. If ratios of the width and the height of the coordinates $(x_f, y_f)$ on the mapping face to the width and the height of the mapping face in which the point is located are ($u_f$, $v_f$), respectively, a calculation formula may be as follows:

$$\begin{cases} u_f = 2 \cdot \frac{x_f}{W} - 1 \\ v_f = 2 \cdot \frac{y_f}{H} - 1 \end{cases},$$

W and H are respectively the width and the height of the mapping face. Because W is equal to H in a square, a value range of both $u_f$ and $v_f$ is [−1, 1].

For the front-view face AD, the $V_0$ point may be obtained according to the following formula:

$$\begin{cases} x_0 = \frac{x_t}{\sqrt{x_t^2 + y_t^2 + z_t^2}} \\ y_0 = \frac{y_t}{\sqrt{x_t^2 + y_t^2 + z_t^2}}, \\ z_0 = \frac{z_t}{\sqrt{x_t^2 + y_t^2 + z_t^2}} \end{cases}$$

where $$\begin{cases} x_t = -|BO| \\ y_t = -v_f \cdot |AB| \\ z_t = u_f \cdot |AB| \end{cases}.$$

|•| indicates a length value, and values of |BO| and |AB| may be obtained through calculation based on the known field angles β, ε, and η, and a geometrical relationship. The point ($x_t$, $y_t$, $z_t$) is an intersection point of the $OV_0$ ray and the front-face view.

For the rear-view face IL, the $V_0$ point may be obtained according to the following calculation formula:

$$\begin{cases} x_0 = \frac{x_t}{\sqrt{x_t^2 + y_t^2 + z_t^2}} \\ y_0 = \frac{y_t}{\sqrt{x_t^2 + y_t^2 + z_t^2}}, \\ z_0 = \frac{z_t}{\sqrt{x_t^2 + y_t^2 + z_t^2}} \end{cases}$$

where $$\begin{cases} x_t = 1 \\ y_t = -v_f \cdot |IK| \\ z_t = -u_f \cdot |IK| \end{cases}.$$

A value of |IK| may be obtained through calculation based on the known field angles β, ε, and η, and the geometrical relationship.

For the side-view face, in an example of a mapping face AI, which is a trapezoidal mapping face, the ratios ($u_f$, $v_f$) of the width and the height may be obtained according to the following formula:

$$\begin{cases} u_f = 2 \cdot \frac{x_f}{|AJ|} - 1 \\ v_f = \frac{2y_f - |IL|}{|AD| + 2x_f \cdot \tan\theta} \end{cases},$$

where
|AJ|, |AD|, and |IL| may be obtained through calculation based on the known field angles β, ε, and η, and the geometrical relationship. A value range of $u_f$ and $v_f$ is also [−1, 1].

The value range of $u_f$ is changed to [0,|AJ|] to facilitate calculation. In other words, $u_f$ is replaced with a value of $x_f$, to obtain $u'_f = x_f$. According to an equal-angle mapping method, an adjusted $u'_f$ may be first obtained and is set to $u_{adj}$. $u_{adj}$ is calculated according to the following formula:

$$u_{adj} = \begin{cases} \left(|AP| - \tan\left(\lambda - \frac{\lambda \cdot u'_f}{|AP|}\right)\right) \cdot \cos\theta, \text{ if } 0 \le u'_f \le |AP| \\ \left(|AP| + \tan\left(\varepsilon \cdot \frac{u'_f - |AP|}{|PJ|}\right)\right) \cdot \cos\theta, \text{ if } |AP| \le u'_f \le |AJ| \end{cases},$$

where
OC⊥AI and AP⊥CP. Values of |AP| and |PJ| may be obtained through calculation based on the known field angles β, ε, and η, and the geometrical relationship. Therefore, the $V_0$ point may be obtained according to the following calculation formula:

$$\begin{cases} x_0 = \frac{x_t}{\sqrt{x_t^2 + y_t^2 + z_t^2}} \\ y_0 = \frac{y_t}{\sqrt{x_t^2 + y_t^2 + z_t^2}}, \\ z_0 = \frac{z_t}{\sqrt{x_t^2 + y_t^2 + z_t^2}} \end{cases}$$

where $$\begin{cases} x_t = u_{adj} - |BO| \\ y_t = -(|AB| + u_{adj} \cdot \tan\theta) \cdot v_f \\ z_t = |AB| + u_{adj} \cdot \tan\theta \end{cases}.$$

A mapping point of another side-view face on a corresponding spherical surface may be obtained in a similar manner.

(2) A size of a mapping face is scaled based on a specific proportion coefficient, so that the mapping face may be tangent to a sphere whose offset point is the sphere center and whose radius is an original sphere radius, to obtain a corresponding mapping point on a scaled plane.

In this embodiment, the six mapping surfaces of the quadrangular pyramid are scaled to a same size to form a cube. The cube is tangent to the offset sphere whose sphere center is the S point. A diameter of the spherical image is used as a side length of each face of the scaled cube. It can be learned that a pixel in the front-view face is expanded, a pixel in the rear-view face is shrunk, and a pixel in the side-view face is gradually shrunk in a direction from the front-view face to the rear-view face. The position of the point on the mapping face may be changed based on a function (x', y', z')=$f_m$(x, y, z, s), where (x, y, z) is a pixel on the spherical image, (x', y', z') is a point on the mapping face of the cube tangent to the offset sphere, and s is a scaling coefficient corresponding to coordinates (x, y, z). On the contrary, the pixel that is on the spherical image and that corresponds to the point on the mapping face of the cube tangent to the offset sphere may also be obtained based on an inverse function (x, y, z)=$f_m^{-1}$(x', y', z', s') of $f_m$.

Figure 9:
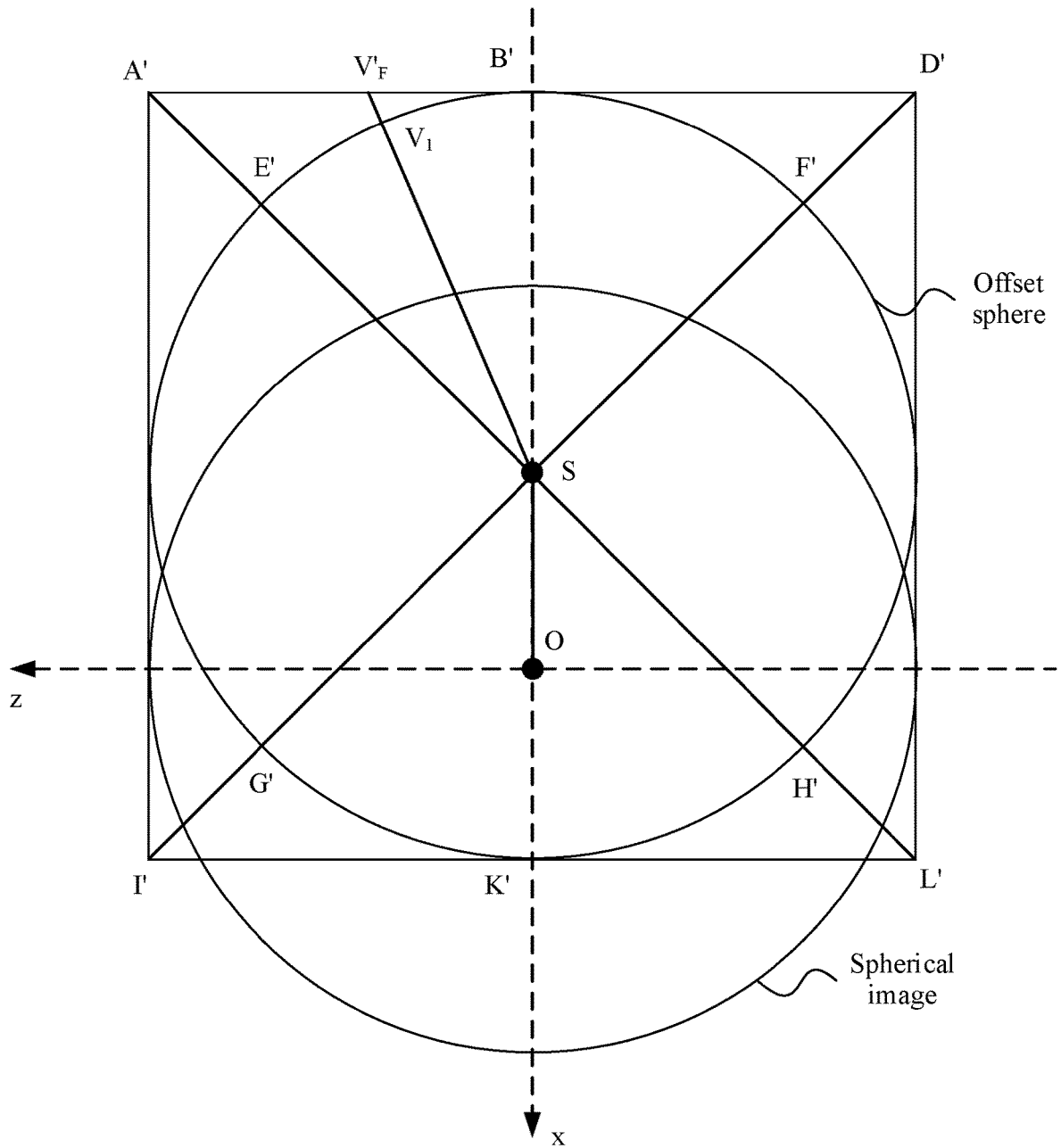
FIG. 9 is a schematic diagram of region division in Embodiment 2 of a spherical image processing method according to this application.

FIG. 9 is a schematic diagram of region division in Embodiment 2 of a spherical image processing method according to this application. As shown in FIG. 9, a front-view face AD plane in FIG. 8a is expanded to an A'D' plane, a side-view face AI plane is scaled to an A'I' plane, and a rear-view face IL plane is shrunk to an I'L' plane. In this case, a scaling coefficient of the AD plane may be $s_f$=|A'D'|/|AD|, and a scaling coefficient of the IL plane may be $s_b$=|I'L'|/|IL|, where |•| indicates a length value. For a point A' to a point I' in the side-view face, a scaling coefficient sa may be linearly decreased from $s_f$ to $s_b$. By performing a scaling operation on different mapping faces, a coordinate position on the mapping face is changed. For example, after a $V_F$ point ($x_F$, $y_F$, $Z_F$) on the AD plane is scaled and corresponds to a $V'_F$ point ($x'_F$, $y'_F$, $Z'_F$) on A'D'. On the contrary, for any $V_F$ point on A'D', a $V_F$ point on AD may be obtained according to inverse scaling.

(3) A spherical face mapping point whose offset point is the sphere center and that corresponds to the scaled plane is obtained.

After the mapping face is changed, the mapping face is tangent to the sphere, and a spherical face region corresponding to the mapping face is accordingly changed. For example, the arc surface EF in FIG. 8a corresponds to an arc surface E'F' in FIG. 9, an arc surface EG corresponds to an arc surface E'G', and an arc surface GH corresponds to an arc surface G'H'. Therefore, in this operation, a point on the mapping face is inversely mapped to a corresponding region of the offset sphere based on an inverse mapping function ($x_1,y_1,z_1$)=$f_i$($x'_F,y'_F,z'_F$). For example, the $V_F$ point on the A'D' plane is inversely mapped to a $V_1$ ($x_1,y_1,z_1$) point on the arc surface E'F'.

For example, this operation may be performed by using an inverse mapping function from the hexahedron to the sphere. For example, for the front-view face A'D', two-dimensional coordinates ($x_{F'}$, $y_{F'}$) on the mapping face corresponding to the $V_1$($x_1,y_1,z_1$) point on the spherical surface may be obtained according to the following formula:

$$\begin{cases} x_{F'} = \left(\frac{z_1}{|x_1|}+1\right) \cdot \frac{|A'D'|}{2} \\ y_{F'} = \left(\frac{-y_1}{|x_1|}+1\right) \cdot \frac{|A'D'|}{2} \end{cases},$$

where $$\begin{cases} x_{F'} = \left(\frac{4 \cdot \arctan\left(\frac{x_1}{|z_1|}\right)}{\pi}+1\right) \cdot \frac{|A'D'|}{2} \\ y_{F'} = \left(\frac{-y_1}{|z_1|}+1\right) \cdot \frac{|A'D'|}{2} \end{cases}$$

The two-dimensional coordinates ($x_{F'}$, $y_{F'}$) on the mapping face are obtained, and correspond to a position $V'_F$ point ($x'_F$, $y'_F$, $z'_F$) of the mapping face in three-dimensional space.

After the foregoing operations, the pixel $V_0$($x_0$, $y_0$, $z_0$) on the spherical image may be obtained for each pixel $V_1$($x_1$, $y_1$, $z_1$) on the offset sphere. Therefore, after the mapping relationship between the offset sphere and the pixel on the spherical image is obtained, the pixel $V_1$($x_1$, $y_1$, $z_1$) on the offset sphere may be obtained in an interpolation manner based on the pixel $V_0$($x_0$, $y_0$, $z_0$) on the spherical image and associated pixels in associated neighboring regions.

Because a distance between two points on the offset sphere changes compared with a distance between corresponding two points on the original spherical surface, the associated pixels of the pixel on the offset sphere accordingly increase or decrease, and the associated neighboring regions also change. Pixel expansion or shrinkage occurs compared with the original spherical image.

Based on the foregoing technical solution, when the spherical image uses non-three-dimensional space spherical coordinates to represent pixels, the non-three-dimensional space spherical coordinates in this application include any one of pixel coordinates in an equirectangular projection (ERP) format, pixel coordinates in a cubemap projection (CMP) format, pixel coordinates in Craster parabolic projection (CPP) format, pixel coordinates in an adjusted cubemap projection (ACP) format, and pixel coordinates in a truncated square pyramid projection (TSP) format, pixel coordinates in a compact octahedron projection (COHP) format, and pixel coordinates in a compact icosahedral projection (CISP) format. Therefore, after obtaining the spherical image, the server first maps coordinates representing pixels on the spherical image to three-dimensional space spherical coordinates that use the sphere center as an origin, performs the image processing on the spherical image by using the technical solution in the foregoing method embodiment, and then the server inversely maps the coordinates representing the pixels on the spherical image to the three-dimensional space spherical coordinates.

Example 1: Pixel coordinates in an ERP format are used to represent pixels on the spherical image. ERP evenly samples and maps a spherical signal based on longitude and latitude, to obtain a two-dimensional panorama image that can be used for storage and transmission. Pixel coordinates of the two-dimensional panorama image may be represented by using longitude and latitude. Pixel coordinates in a width direction may be represented by longitude, and the span is 360°. Pixel coordinates in a height direction may be represented by latitude, and the span is 180°. After the viewpoint moves from the sphere center, the server first performs pixel coordinate mapping on the obtained spherical image.

For any point (m, n) on an ERP format image, where m is a horizontal coordinate of the image, and n is a vertical coordinate of the image, values of longitude and latitude of a corresponding point may be obtained according to a mapping formula between a point on a longitude and latitude map and spherical longitude and latitude:

$$\begin{cases} \phi_1 = \left(\frac{(m+\varepsilon_0)}{W_1} - \frac{1}{2}\right) \cdot 2\pi \\ \lambda_1 = \left(\frac{1}{2} - \frac{(n+\varepsilon_0)}{H_1}\right) \cdot \pi \end{cases},$$

$W_1$ is the width of the ERP format image; $H_1$ is the height of the ERP format image; $\phi_1$ is the longitude of the spherical image and its value range is $[-\pi, \pi]$; $\lambda_1$ is the latitude of the spherical image and its value range is $[-\pi/2, \pi/2]$; $\varepsilon_0$ is a constant and indicates a coordinate offset, its value range is [0, 1), and its value is usually 0 or 0.5. Then, the server may obtain to-be-generated coordinates $V_1$($x_1$, $y_1$, $z_1$) on the spherical surface according to a correspondence between the spherical longitude and latitude and the spherical coordinates:

$$\begin{cases} x_1 = \cos(\lambda)\cos(\phi) \\ y_1 = \sin(\lambda) \\ z_1 = -\cos(\lambda)\sin(\phi) \end{cases}$$

After the server processes the spherical image according to the technical solution in the foregoing method embodiment, the server may obtain longitude and latitude coordinates ($\phi_0$, $\lambda_0$) that are on the original longitude and latitude map and that are of the $V_0(x_0, y_0, z_0)$ point on the corresponding spherical surface according to a formula for converting spherical coordinates into longitude and latitude coordinates in an ERP format:

$$\begin{cases} \phi_0 = -\arctan2(z_0, x_0) \\ \lambda_0 = \arcsin\left(\dfrac{y_0}{\sqrt{x_0^2 + y_0^2 + z_0^2}}\right) \end{cases},$$

arctan $2(z_0, x_0)$ indicates an angle value of arctan($z_0/x_0$) determined based on a quadrant of coordinates ($x_0$, $z_0$), and an angle range is $(-\pi, \pi]$. Then, the server further obtains a pixel position (m', n') of the point on the original longitude and latitude map according to a formula for converting longitude and latitude coordinates into image coordinates:

$$\begin{cases} m' = \dfrac{(\pi - \phi_0) \cdot W_0}{2\pi} \\ n' = \dfrac{\left(\dfrac{\pi}{2} - \lambda\right) \cdot H_0}{\pi} \end{cases},$$

where $W_0$ is the width of the original ERP image, and $H_0$ is the height of the original ERP image.

Example 2: Pixel coordinates in a CMP format are used to represent pixels on the spherical image. After the viewpoint moves from the sphere center, the server first performs pixel coordinate mapping on the obtained spherical image. A mapping face (a face in the reverse direction of the x-axis, that is, a front-view face) in a CMP format image is used as an example. For any point (m, n) on the front-view face of the CMP format image, where m is a horizontal coordinate of the image, and n is a vertical coordinate of the image, values of corresponding spherical coordinates $V_1(x_1, y_1, z_1)$ may be obtained according to a mapping formula between the point on the front-view face of the CMP format image and spherical coordinates:

$$\begin{cases} x_1 = \dfrac{x_t}{\sqrt{x_t^2 + y_t^2 + z_t^2}} \\ y_1 = \dfrac{y_t}{\sqrt{x_t^2 + y_t^2 + z_t^2}} \\ z_1 = \dfrac{z_t}{\sqrt{x_t^2 + y_t^2 + z_t^2}} \end{cases},$$

where $$\begin{cases} x_t = -1 \\ y_t = -\left(\dfrac{2(m+\varepsilon_0)}{W_1} - 1\right) \\ z_t = \dfrac{2(n+\varepsilon_0)}{H_1} - 1 \end{cases},$$

where $W_1$ is the width of the front-view face of the CMP format image; $H_1$ is the height of the front-view face of the CMP format image; $\varepsilon_0$ is a constant and indicates a coordinate offset, its value range is [0, 1), and its value is usually 0 or 0.5. For other mapping faces of the CMP format image, each point that is on the mapping faces and that corresponds to coordinates on the spherical surface may be obtained in a similar manner.

After the server processes the spherical image according to the technical solution in the foregoing method embodiment, the server may obtain coordinates (m', n') of a pixel position that is on the original CMP format image and that corresponds to the $V_0(x_0, y_0, z_0)$ point on the spherical surface according to a formula for converting spherical coordinates into CMP-format mapping face coordinates (the front-view face is used as an example):

$$\begin{cases} m' = \left(\dfrac{z_1}{|x_1|} + 1\right) \cdot \dfrac{W_0}{2} \\ n' = \left(\dfrac{-y_1}{|x_1|} + 1\right) \cdot \dfrac{H_0}{2} \end{cases},$$

where $W_0$ is the width of a mapping face of the original CMP format image, and $H_0$ is the height of the mapping face of the original CMP format image. Coordinates that are on the entire spherical surface and that correspond to pixel positions on all mapping faces may be obtained in a similar manner.

Based on the foregoing technical solution, when the spherical image is a 3D panoramic spherical image, the 3D panoramic spherical image includes a left-eye spherical image and a right-eye spherical image. Therefore, for the left-eye spherical image, the server determines a left-eye sphere center of the left-eye spherical image, obtains a left-eye viewpoint, determines a pixel expansion region and a pixel shrinkage region on the left-eye spherical image based on the left-eye sphere center and the left-eye viewpoint, and performs the image processing on the left-eye spherical image. For the right-eye spherical image, the server determines a right-eye sphere center of the right-eye spherical image, obtains a right-eye viewpoint, determines a pixel expansion region and a pixel shrinkage region on the right-eye spherical image based on the right-eye sphere center and the right-eye viewpoint, and performs the image processing on the right-eye spherical image. In addition, for both the left-eye spherical image and the right-eye spherical image, a transition region may be determined in addition to the pixel expansion region and the pixel shrinkage region as described in the foregoing method embodiment, and then corresponding image processing is separately performed on the pixel expansion region, the pixel shrinkage region, and the transition region.

The 3D panoramic spherical image refers to a panoramic video in a 3D format. Each frame of image includes two 360-degree spherical images. One is used for left-eye display (the left-eye spherical image), and the other is used for right-eye display (the right-eye spherical image). Content in a same frame of the two images provided for left-eye display and right-eye display is slightly different. As a result, 3D effect is achieved when the user views the images. Therefore, in this embodiment, the server uses the image processing method in the technical solution in the foregoing method embodiment to separately perform the image processing on the left-eye spherical image and the right-eye spherical image.

Figure 10:
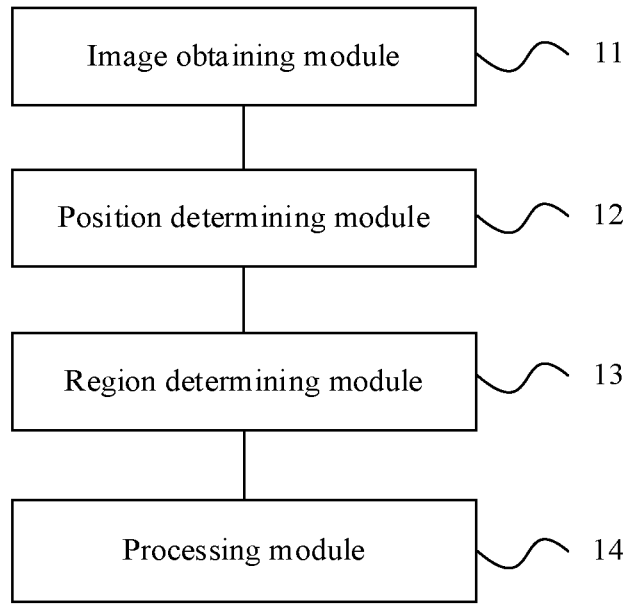
FIG. 10 is a schematic diagram of a structure of an embodiment of a spherical image processing apparatus according to this application.

FIG. 10 is a schematic diagram of a structure of an embodiment of a spherical image processing apparatus according to this application. As shown in FIG. 10, the apparatus in this embodiment may include an image obtaining module 11, a position determining module 12, a region determining module 13, and a processing module 14. The image obtaining module 11 is configured to obtain a spherical image and determine a sphere center of the spherical image. The position determining module 12 is configured to determine a viewpoint of a user when the user views the spherical image, where the viewpoint is located at any point, other than the sphere center, in sphere space surrounded by the spherical image. The region determining module 13 is configured to determine a pixel expansion region and a pixel shrinkage region on the spherical image based on the sphere center and the viewpoint. The processing module 14 is configured to perform image processing on the spherical image, where the image processing includes performing pixel expansion processing on an image in the pixel expansion region, and perform pixel shrinkage processing on an image in the pixel shrinkage region, where the pixel expansion processing includes increasing a quantity of image pixels in the pixel expansion region, and the pixel shrinkage processing includes reducing a quantity of image pixels in the pixel shrinkage region.

Based on the foregoing technical solution, the region determining module 13 is configured to determine a pixel that is on the spherical image and that satisfies a geometric rule, and determine the pixel expansion region and the pixel shrinkage region based on the pixel, where the geometric rule is set based on the sphere center and the viewpoint.

Based on the foregoing technical solution, the region determining module 13 is configured to determine, based on an offset of the viewpoint relative to the sphere center, first pixels that are on the spherical image and whose distances from the viewpoint are equal to r; and determine the pixel expansion region and the pixel shrinkage region by using a circle connecting the first pixels as a boundary, where a region including a pixel whose distance from the viewpoint is less than r is used as the pixel expansion region, and a region including a pixel whose distance from the viewpoint is greater than r is used as the pixel shrinkage region.

Based on the foregoing technical solution, the region determining module 13 is configured to determine, by using the viewpoint as a vertex and by using a connection line from the viewpoint to the sphere center as an angular bisector, second pixels that are on the spherical image and that correspond to an angle whose angular degree is θ; and determine the pixel expansion region and the pixel shrinkage region by using an arc connecting the second pixels as a boundary, where a region closer to the viewpoint is used as the pixel expansion region, and a region farther from the viewpoint is used as the pixel shrinkage region.

Based on the foregoing technical solution, the region determining module is further configured to determine a transition region on the spherical image based on the sphere center and the viewpoint, where the image processing further includes: performing pixel expansion processing on a part that is in an image in the transition region and closer to the pixel expansion region, and performing pixel shrinkage processing on a part that is in the image in the transition region and closer to the pixel shrinkage region.

Based on the foregoing technical solution, the region determining module 13 is configured to construct a hexahedron tangent to the spherical image based on the sphere center and the viewpoint; construct six cones based on faces of the hexahedron and the sphere center; and divide the spherical image into six regions based on pixels at intersection of the six cones and the spherical image, where a region corresponding to a face that is of the hexahedron and that is perpendicular to an extension line of a connection line from the sphere center to the viewpoint is used as the pixel expansion region, a region corresponding to a face that is of the hexahedron and that is perpendicular to an extension line of the connection line from the viewpoint to the sphere center is used as the pixel shrinkage region, and regions corresponding to remaining four faces are used as the transition regions.

Based on the foregoing technical solution, the region determining module 13 is configured to determine, by using the viewpoint as the vertex and by using the extension line of the connection line from the sphere center to the viewpoint as the angular bisector, third pixels that are on the spherical image and that correspond to an angle whose angular degree is ψ, where the angle whose angular degree is ψ is an FoV angle at the viewpoint; and construct a square pyramid tangent to the spherical image, where the top of the square pyramid is enclosed by an extension line of a connection line from the sphere center to the third pixels and a point that a plane tangent to the spherical image touches.

Based on the foregoing technical solution, the region determining module 13 is configured to determine, by using the viewpoint as the vertex and by using the extension line of the connection line from the sphere center to the viewpoint as the angular bisector, third pixels that are on the spherical image and that correspond to an angle whose angular degree is ψ, where the angle whose angular degree is ψ is an FoV angle at the viewpoint; determine, by using the sphere center as a vertex and by using the extension line of the connection line from the viewpoint to the sphere center as an angular bisector, fourth pixels that are on the spherical image and that correspond to an angle whose angular degree is δ, where the angle whose angular degree is δ is a rear-view field angle; and construct a quadrangular pyramid partially tangent to the spherical image, where a side face of the quadrangular pyramid is tangent to the spherical image; the top of the quadrangular pyramid is enclosed by an extension line of a connection line from the sphere center to the third pixels and a point that the side face of the quadrangular pyramid touches, and the bottom of the quadrangular pyramid is enclosed by an extension line of a connection line from the sphere center to the fourth pixels and the point that the side face of the quadrangular pyramid touches.

Based on the foregoing technical solution, the region determining module 13 is configured to: on the spherical image, use a region corresponding to the top of the quadrangular pyramid as the pixel expansion region, use a region corresponding to the bottom of the quadrangular pyramid as the pixel shrinkage region, and use a region corresponding to the side face of the quadrangular pyramid as the transition region.

Based on the foregoing technical solution, the processing module 14 is configured to construct an offset sphere by using the viewpoint as the sphere center and by using a radius of the sphere space surrounded by the spherical image as a radius; divide a spherical surface of the offset sphere into a plurality of regions, where the plurality of regions are in a one-to-one correspondence with the regions on the divided spherical image; and determine a mapping relationship between a region on the offset sphere and a corresponding region on the divided spherical image, and perform the image processing on the divided spherical image according to the mapping relationship.

Based on the foregoing technical solution, the processing module 14 is configured to determine a mapping relationship between a point on the offset sphere and a pixel on the spherical image.

Based on the foregoing technical solution, the processing module 14 is configured to adjust the quadrangular pyramid to construct a cube tangent to the offset sphere, where each face of the cube and the viewpoint constitute six cones, and divide the offset sphere into six regions based on pixels at intersection of the six cones and the offset sphere; and determine a mapping relationship between a pixel on the spherical image and a point on the quadrangular pyramid, and determine a mapping relationship between the cube and the offset sphere, and determine the mapping relationship between the point on the offset sphere and the pixel on the spherical image based on a mapping relationship between the quadrangular pyramid and the cube.

Based on the foregoing technical solution, when the spherical image uses non-three-dimensional space spherical coordinates to represent pixels, the non-three-dimensional space spherical coordinates include any one of pixel coordinates in an equirectangular projection ERP format, pixel coordinates in a cubemap projection CMP format, pixel coordinates in a Craster parabolic projection CPP format, pixel coordinates in an adjusted cubemap projection ACP format, and pixel coordinates in a truncated square pyramid projection TSP format, pixel coordinates in a compact octahedron projection COUP format, and pixel coordinates in a compact icosahedral projection CISP format; the image obtaining module 11 is further configured to map coordinates representing pixels in the spherical image to three-dimensional space spherical coordinates that use the sphere center as an origin; and the processing module 14 is further configured to inversely map the coordinates representing the pixels in the spherical image to the non-three-dimensional space spherical coordinates.

Based on the foregoing technical solution, when the spherical image is a 3D panoramic spherical image, the 3D panoramic spherical image includes a left-eye spherical image and a right-eye spherical image. For the left-eye spherical image, the image obtaining module 11 is further configured to determine a left-eye sphere center of the left-eye spherical image; the position determining module 12 is further configured to obtain a left-eye viewpoint; the region division module 13 is further configured to determine a pixel expansion region and a pixel shrinkage region on the left-eye spherical image based on the left-eye sphere center and the left-eye viewpoint; and the processing module 14 is further configured to perform the image processing on the left-eye spherical image. For the right-eye spherical image, the image obtaining module 11 is further configured to determine a right-eye sphere center of the right-eye spherical image, the position determining module 12 is further configured to obtain a right-eye viewpoint, the region division module 13 is further configured to determine a pixel expansion region and a pixel shrinkage region on the right-eye spherical image based on the right-eye sphere center and the right-eye viewpoint; and the processing module 14 is further configured to perform the image processing on the right-eye spherical image.

The apparatus in this application may be used in the technical solution of the foregoing method embodiment. Implementation principles and technical effects of the apparatus are similar to those of the method embodiment, and are not described herein again.

Figure 11:
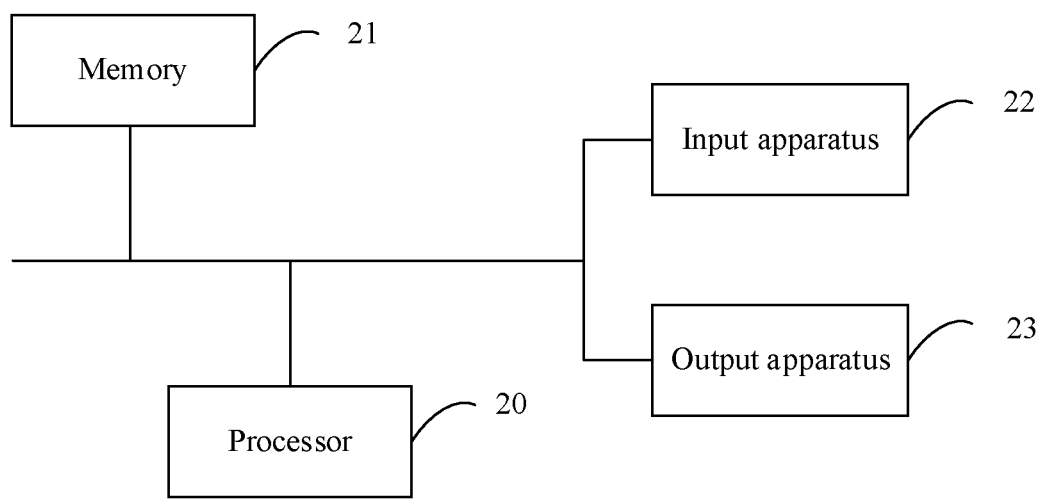
FIG. 11 is a schematic diagram of a structure of an embodiment of a server according to this application.

FIG. 11 is a schematic diagram of a structure of an embodiment of a server according to this application. As shown in FIG. 11, the server includes a processor 20, a memory 21, an input apparatus 22, and an output apparatus 23. There may be one or more processors 20 in the server. One processor 20 is used as an example in FIG. 11. The processor 20, the memory 21, the input apparatus 22, and the output apparatus 23 in the server may be connected through a bus or in another manner. FIG. 11 exemplifies connection through a bus.

As a computer-readable storage medium, the memory 21 may be configured to store a software program, a computer-executable program, and a module, for example, a program instruction/module corresponding to the spherical image processing method in the embodiments of this application. By running the software program, the instruction, and the module that are stored in the memory 21, the processor 20 executes various function applications of the server and performs data processing, that is, implements the foregoing spherical image processing method.

The memory 21 may mainly include a program storage area and a data storage area. The program storage area may store an operating system and an application program required by at least one function. The data storage area may store data created based on use of a terminal, and the like. In addition, the memory 21 may include a high-speed random access memory, and may further include a non-volatile memory, for example, at least one magnetic disk storage device, a flash memory device, or another non-volatile solid-state storage device. In some examples, the memory 21 may further include memories that are remotely disposed relative to the processor 20, and these remote memories may be connected to the server over a network. Examples of the foregoing network include but are not limited to the internet, an intranet, a local area network, a mobile communications network, and a combination thereof.

The input apparatus 22 may be configured to receive input digital or character information, and generate a key signal input related to user setting and function control of the server. The output apparatus 23 may include a display device such as a display screen.

This application further provides a computer-readable storage medium. The computer-readable storage medium stores a computer program. The computer program includes at least one line of code. The at least one line of code is executed by a computer to perform the spherical image processing method in any one of the foregoing method embodiments.

This application further provides a computer program. When executed by a computer, the computer program is used to perform the spherical image processing method in any one of the foregoing method embodiments.

Ordinary technical support personnel in this field may understand that all or some of the operations in the foregoing method embodiments may be implemented by program-instructing related hardware. The foregoing program may be stored in a computer-readable storage medium. When the program runs, the operations in the foregoing method embodiments are performed. The foregoing storage media include: any medium that can store program code, such as a ROM, a RAM, a magnetic disk, or an optical disc.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A spherical image processing method, comprising:
obtaining a spherical image and determining a sphere center of the spherical image;
determining a viewpoint of a user when the user views the spherical image, wherein the viewpoint is located at any point, other than the sphere center, in a sphere space surrounded by the spherical image;
determining a pixel expansion region and a pixel shrinkage region on the spherical image based on the sphere center and the viewpoint; and
performing an image processing operation on the spherical image, wherein the image processing operation comprises a pixel expansion processing operation on an image in the pixel expansion region, and a pixel shrinkage processing operation on an image in the pixel shrinkage region, wherein the pixel expansion processing operation comprises increasing a quantity of image pixels in the pixel expansion region, and wherein the pixel shrinkage processing operation comprises reducing a quantity of image pixels in the pixel shrinkage region,
wherein the determining of the pixel expansion region and the pixel shrinkage region comprise:
determining, based on an offset of the viewpoint relative to the sphere center, first pixels that are on the spherical image and whose distances from the viewpoint are equal to r; and
determining the pixel expansion region and the pixel shrinkage region using a circle connecting the first pixels as a boundary, wherein a region comprising a pixel whose distance from the viewpoint is less than r is used as the pixel expansion region, and a region comprising a pixel whose distance from the viewpoint is greater than r is used as the pixel shrinkage region.

2. The method according to claim 1, wherein the determining of the pixel expansion region and the pixel shrinkage region on the spherical image based on the sphere center and the viewpoint comprises:
determining a pixel that is on the spherical image and that satisfies a geometric rule, and determining the pixel expansion region and the pixel shrinkage region based on the pixel, wherein the geometric rule is set based on the sphere center and the viewpoint.

3. The method according to claim 2, wherein the determining of the pixel and the determining of the pixel expansion region and the pixel shrinkage region comprise:
determining, using the viewpoint as a vertex and using a connection line from the viewpoint to the sphere center as an angular bisector, second pixels that are on the spherical image and that correspond to an angle whose angular degree is θ; and
determining the pixel expansion region and the pixel shrinkage region using an arc connecting the second pixels as a boundary, wherein a region closer to the viewpoint is used as the pixel expansion region, and a region farther from the viewpoint is used as the pixel shrinkage region.

4. The method according to claim 1, further comprising:
determining a transition region on the spherical image based on the sphere center and the viewpoint;
wherein the image processing operation further comprises: performing a pixel expansion processing operation on a part that is in an image in the transition region and closer to the pixel expansion region, and performing a pixel shrinkage processing operation on a part that is in the image in the transition region and closer to the pixel shrinkage region.

5. The method according to claim 4, wherein the determining of the transition region on the spherical image based on the sphere center and the viewpoint comprises:
constructing a hexahedron tangent to the spherical image based on the sphere center and the viewpoint;
constructing six cones based on faces of the hexahedron and the sphere center; and
dividing the spherical image into six regions based on pixels at intersection of the six cones and the spherical image, wherein a region corresponding to a face that is of the hexahedron and that is perpendicular to an extension line of a connection line from the sphere center to the viewpoint is used as the pixel expansion region, wherein a region corresponding to a face that is of the hexahedron and that is perpendicular to an extension line of the connection line from the viewpoint to the sphere center is used as the pixel shrinkage region, and wherein regions corresponding to remaining four faces are used as transition regions.

6. The method according to claim 5, wherein the constructing of the hexahedron tangent to the spherical image based on the sphere center and the viewpoint comprises:
determining, using the viewpoint as a vertex and using the extension line of the connection line from the sphere center to the viewpoint as an angular bisector, third pixels that are on the spherical image and that correspond to an angle whose angular degree is ψ, wherein the angle whose angular degree is ψ is a field of view (FoV) angle at the viewpoint; and
constructing a square pyramid tangent to the spherical image, wherein the top of the square pyramid is enclosed by an extension line of a connection line from the sphere center to the third pixels and a point that a plane tangent to the spherical image touches.

7. The method according to claim 5, wherein the constructing of the hexahedron tangent to the spherical image based on the sphere center and the viewpoint comprises:
determining, using the viewpoint as a vertex and using the extension line of the connection line from the sphere center to the viewpoint as an angular bisector, third pixels that are on the spherical image and that correspond to an angle whose angular degree is ψ, and wherein the angle whose angular degree is ψ is an FoV angle at the viewpoint;
determining, using the sphere center as a vertex and using the extension line of the connection line from the viewpoint to the sphere center as an angular bisector, fourth pixels that are on the spherical image and that correspond to an angle whose angular degree is δ, wherein the angle whose angular degree is δ is a rear-view field angle; and constructing a quadrangular pyramid partially tangent to the spherical image, wherein a side face of the quadrangular pyramid is tangent to the spherical image, wherein the top of the quadrangular pyramid is enclosed by an extension line of a connection line from the sphere center to the third pixels and a point that the side face of the quadrangular pyramid touches, and wherein the bottom of the quadrangular pyramid is enclosed by an extension line of a connection line from the sphere center to the fourth pixels and the point that the side face of the quadrangular pyramid touches.

8. The method according to claim 7, wherein the dividing of the spherical image into six regions based on pixels at intersection of the six cones and the spherical image comprises:
on the spherical image, using a region corresponding to the top of the quadrangular pyramid as the pixel expansion region, using a region corresponding to the bottom of the quadrangular pyramid as the pixel shrinkage region, and using a region corresponding to the side face of the quadrangular pyramid as the transition region.

9. The method according to claim 8, wherein performing of the image processing operation on the spherical image comprises:
constructing an offset sphere using the viewpoint as the sphere center and using a radius of the sphere space surrounded by the spherical image as a radius; and
dividing a spherical surface of the offset sphere into a plurality of regions, wherein the plurality of regions are in a one-to-one correspondence with the regions on the divided spherical image;
determining a mapping relationship between a region on the offset sphere and a corresponding region on the divided spherical image; and
performing the image processing operation on the divided spherical image according to the mapping relationship.

10. The method according to claim 9, wherein the determining of the mapping relationship between the region on the offset sphere and the corresponding region on the divided spherical image comprises:
determining a mapping relationship between a point on the offset sphere and a pixel on the spherical image.

11. The method according to claim 10, wherein the determining of the mapping relationship between the point on the offset sphere and the pixel on the spherical image comprises:
adjusting the quadrangular pyramid to construct a cube tangent to the offset sphere, wherein each face of the cube and the viewpoint constitutes six cones, and dividing the offset sphere into six regions based on pixels at intersection of the six cones and the offset sphere; and
determining a mapping relationship between a pixel on the spherical image and a point on the quadrangular pyramid, and determining a mapping relationship between the cube and the offset sphere, and determining the mapping relationship between the point on the offset sphere and the pixel on the spherical image based on a mapping relationship between the quadrangular pyramid and the cube.

12. The method according to claim 1, wherein when the spherical image uses non-three-dimensional space spherical coordinates to represent pixels, the non-three-dimensional space spherical coordinates comprise any one of pixel coordinates in an equirectangular projection ERP format, pixel coordinates in a cubemap projection CMP format, pixel coordinates in a Craster parabolic projection CPP format, pixel coordinates in an adjusted cubemap projection ACP format, and pixel coordinates in a truncated square pyramid projection TSP format, pixel coordinates in a compact octahedron projection COUP format, and pixel coordinates in a compact icosahedral projection CISP format;
after the obtaining of the spherical image, the method further comprises:
mapping coordinates representing pixels in the spherical image to three-dimensional space spherical coordinates that use the sphere center as an origin; and
after the performing of the image processing operation on the spherical image, the method further comprises:
inversely mapping the coordinates representing the pixels in the spherical image to the non-three-dimensional space spherical coordinates.

13. The method according to claim 1, wherein when the spherical image is a 3D panoramic spherical image, the 3D panoramic spherical image comprises a left-eye spherical image and a right-eye spherical image; and after the obtaining a spherical image, the method further comprises:
for the left-eye spherical image, determining a left-eye sphere center of the left-eye spherical image, obtaining a left-eye viewpoint, determining a pixel expansion region and a pixel shrinkage region on the left-eye spherical image based on the left-eye sphere center and the left-eye viewpoint, and performing the image processing on the left-eye spherical image; and
for the right-eye spherical image, determining a right-eye sphere center of the right-eye spherical image, obtaining a right-eye viewpoint, determining a pixel expansion region and a pixel shrinkage region on the right-eye spherical image based on the right-eye sphere center and the right-eye viewpoint, and performing the image processing on the right-eye spherical image.

14. A spherical image processing apparatus, comprising:
one or more processors; and
a memory storing instructions, when executed by the one or more processors, configures the spherical image processing apparatus to:
obtain a spherical image and determine a sphere center of the spherical image;
determine a viewpoint of a user when the user views the spherical image, wherein the viewpoint is located at any point, other than the sphere center, in a sphere space surrounded by the spherical image;
determine a pixel expansion region and a pixel shrinkage region on the spherical image based on the sphere center and the viewpoint;
perform an image processing operation on the spherical image, wherein the image processing operation comprises a pixel expansion processing operation on an image in the pixel expansion region, and a pixel shrinkage processing operation on an image in the pixel shrinkage region, wherein the pixel expansion processing operation comprises increasing a quantity of image pixels in the pixel expansion region, and the pixel shrinkage processing operation comprises reducing a quantity of image pixels in the pixel shrinkage region; and
determine, based on an offset of the viewpoint relative to the sphere center, first pixels that are on the spherical image and whose distances from the viewpoint are equal to r; and
determine the pixel expansion region and the pixel shrinkage region using a circle connecting the first pixels as a boundary, wherein a region comprising a pixel whose distance from the viewpoint is less than r is used as the pixel expansion region, and a region comprising a pixel whose distance from the viewpoint is greater than r is used as the pixel shrinkage region.

15. The apparatus according to claim 14, wherein the instructions when executed by the one or more processors, configures the spherical image processing apparatus to: determine a pixel that is on the spherical image and that satisfies a geometric rule, and determine the pixel expansion region and the pixel shrinkage region based on the pixel, wherein the geometric rule is set based on the sphere center and the viewpoint.

16. The apparatus according to claim 15, wherein the instructions when executed by the one or more processors, configures the spherical image processing apparatus to: determine, using the viewpoint as a vertex and using a connection line from the viewpoint to the sphere center as an angular bisector, second pixels that are on the spherical image and that correspond to an angle whose angular degree is θ; and determine the pixel expansion region and the pixel shrinkage region using an arc connecting the second pixels as a boundary, wherein a region closer to the viewpoint is used as the pixel expansion region, and a region farther from the viewpoint is used as the pixel shrinkage region.

17. The apparatus according to claim 14, wherein the instructions when executed by the one or more processors, configures the spherical image processing apparatus to: determine a transition region on the spherical image based on the sphere center and the viewpoint; and perform a pixel expansion processing operation on a part that is in an image in the transition region and closer to the pixel expansion region, and performing a pixel shrinkage processing operation on a part that is in the image in the transition region and closer to the pixel shrinkage region.

18. The apparatus according to claim 17, wherein the instructions when executed by the one or more processors, configures the spherical image processing apparatus to: construct a hexahedron tangent to the spherical image based on the sphere center and the viewpoint; construct six cones based on faces of the hexahedron and the sphere center; and divide the spherical image into six regions based on pixels at intersection of the six cones and the spherical image, wherein a region corresponding to a face that is of the hexahedron and that is perpendicular to an extension line of a connection line from the sphere center to the viewpoint is used as the pixel expansion region, wherein a region corresponding to a face that is of the hexahedron and that is perpendicular to an extension line of the connection line from the viewpoint to the sphere center is used as the pixel shrinkage region, and wherein regions corresponding to remaining four faces are used as transition regions.

* * * * *